US009296554B2

(12) United States Patent
Ferren

(10) Patent No.: US 9,296,554 B2
(45) Date of Patent: Mar. 29, 2016

(54) EXPEDITIONARY MODULES, SYSTEMS AND PROCESSES HAVING RECONFIGURABLE MISSION CAPABILITIES PACKAGES

(71) Applicant: APPLIED MINDS, LLC, Glendale, CA (US)

(72) Inventor: Bran Ferren, Beverly Hills, CA (US)

(73) Assignee: APPLIED MINDS, LLC, Glendale, CA (US)

( * ) Notice: Subject to any disclaimer, the term of this patent is extended or adjusted under 35 U.S.C. 154(b) by 182 days.

(21) Appl. No.: 13/936,030

(22) Filed: Jul. 5, 2013

(65) Prior Publication Data

US 2014/0008359 A1 Jan. 9, 2014

Related U.S. Application Data

(60) Provisional application No. 61/668,649, filed on Jul. 6, 2012.

(51) Int. Cl.
| | |
|---|---|
| *B62B 5/00* | (2006.01) |
| *B65D 88/12* | (2006.01) |
| *B65D 88/54* | (2006.01) |
| *E04H 5/02* | (2006.01) |
| *E04B 1/348* | (2006.01) |
| *E04H 1/12* | (2006.01) |

(52) U.S. Cl.
CPC .............. *B65D 88/121* (2013.01); *B65D 88/54* (2013.01); *E04H 5/02* (2013.01); *B62B 5/0003* (2013.01); *E04B 2001/34884* (2013.01); *E04H 2001/1283* (2013.01)

(58) Field of Classification Search
CPC ............. B65D 90/0046; B65D 88/022; B65D 88/129; B65D 88/121; B65D 88/54; E04H 5/02; E04H 2001/1283; B62B 5/0003; E04B 2001/34884
USPC ........ 410/7, 8, 32, 66, 67; 414/801, 808, 810; 220/1.5, 23.4, 23.87, 23.88, 23.89
See application file for complete search history.

(56) References Cited

U.S. PATENT DOCUMENTS 4,056,066 A * 11/1977 Homanick ...................... 410/66
5,562,374 A * 10/1996 Plamper ........................... 410/66

* cited by examiner

*Primary Examiner* — Stephen Gordon
(74) *Attorney, Agent, or Firm* — Perkins Coie LLP

(57) ABSTRACT

An expeditionary module comprises one or more mission capabilities package (MCP) carts, to provide a self-contained mission support system, such as in remote and austere environments. The exterior structure of the expeditionary module may to preferably comprise a standard shipping container. One or more MCP carts are stowable within the exterior structure, such as on a U-channel track and I-Beam rail system that runs longitudinally along the floor and ceiling of the exterior structure. The expeditionary module typically comprises a suite of standard equipment, to provide general-purpose functionality. Prior to deployment, one or more MCP carts may preferably be selected for an operation, and are loaded into the expeditionary module, via the U-channel track and I-Beam rail system. Upon arrival at the operation location, personnel readily unload the MCP carts. Additional structures allow personnel to configure one or more MCP carts and containers in a variety of configurations.

11 Claims, 28 Drawing Sheets

42b
Machining and Tooling

42d
Solar Power
Generation

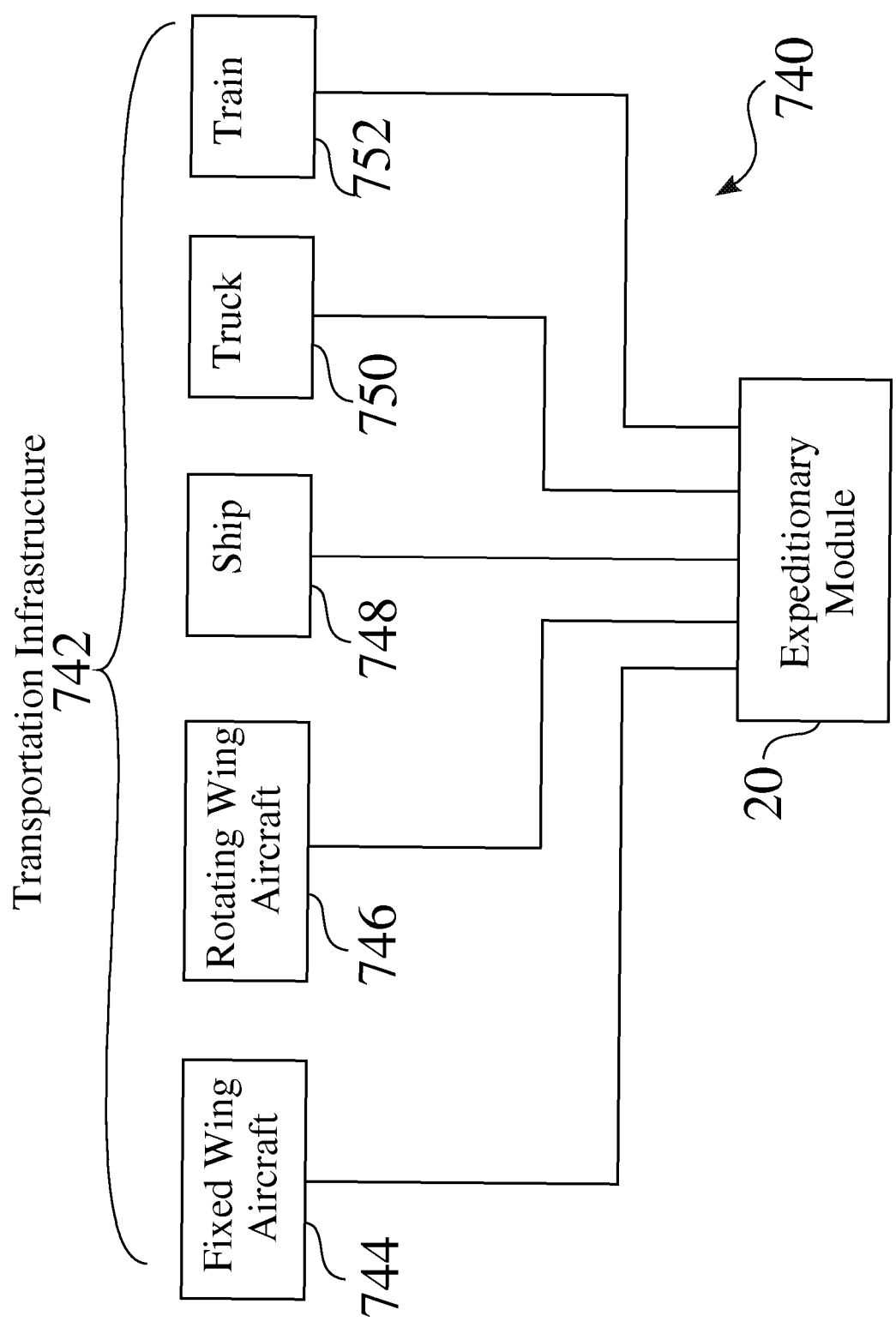

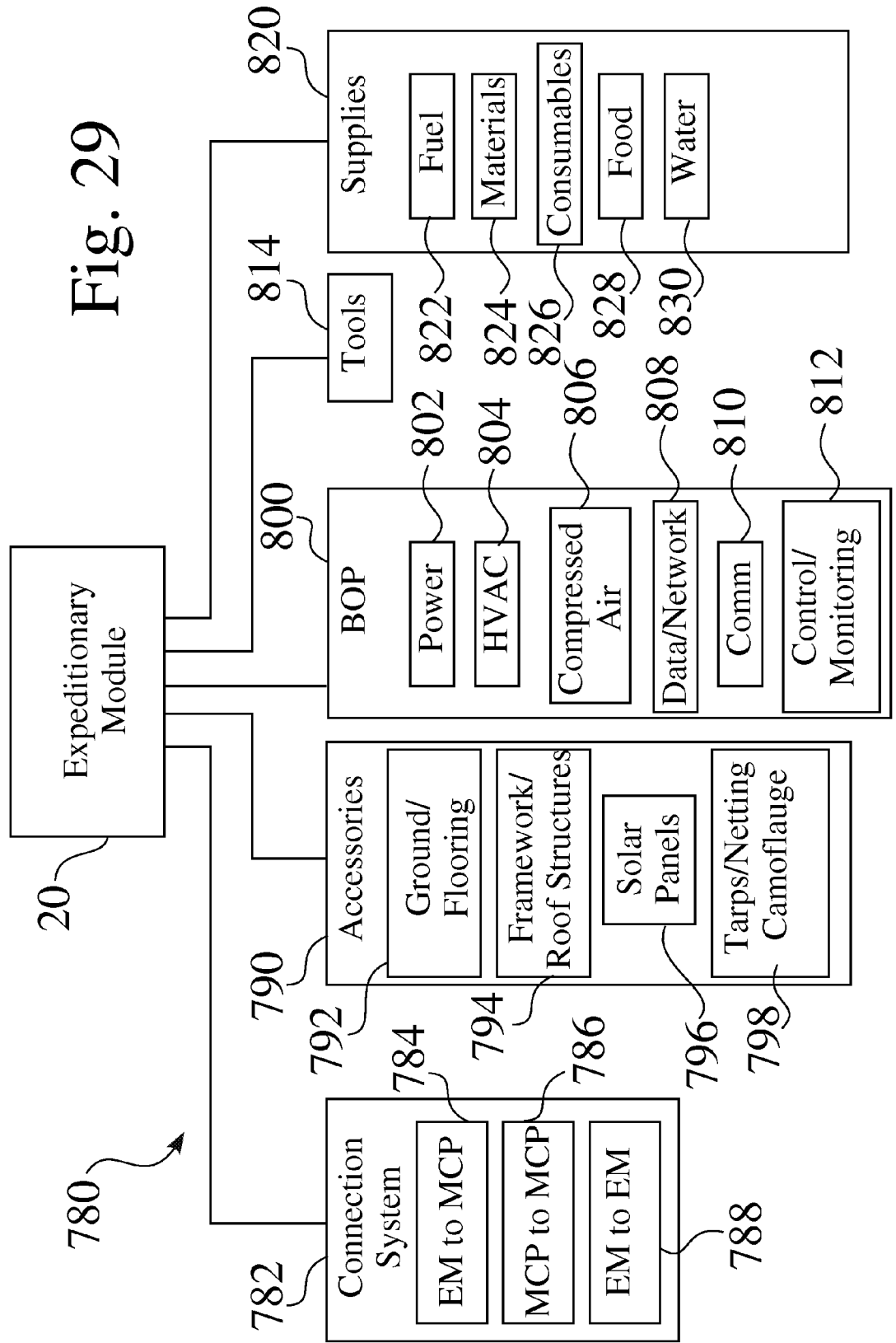

EXPEDITIONARY MODULES, SYSTEMS AND PROCESSES HAVING RECONFIGURABLE MISSION CAPABILITIES PACKAGES

CROSS REFERENCE TO RELATED APPLICATION AND CLAIM FOR PRIORITY

This Application claims priority to U.S. Provisional Patent Application No. 61/668,649, entitled Expeditionary Module with Reconfigurable Mission Capabilities Packages, filed 6 Jul. 2012, which is incorporated herein in its entirety by this reference thereto.

GOVERNMENT RIGHTS

This invention was made with government support under contract number H94003-04-D-004 awarded by the Defense Microelectronics Activity. The government has certain rights in the invention.

FIELD OF THE INVENTION

The present invention relates generally to the field of transportable systems. More particularly, the present invention relates to transportable systems that are designed to provide operational capabilities in remote and austere environments, such as but not limited to any of communications, maintenance, manufacturing, or experimental capabilities.

BACKGROUND OF THE INVENTION

Various types of facilities, e.g. computing clusters and medical clinics, have been fitted into structural shells that match the dimensions of standard shipping containers. These facilities are easily shipped or airlifted to a desired destination, where they can be readily unpacked to provide specialized capabilities, such as to provide computing power or medical treatment.

However, military, exploration, field research, and other complex operations in remote locations often require more general-purpose capabilities, and are therefore not well served by specialized containers. For example, such operations often require a great diversity of new and replacement parts, and it is highly impractical to store every part that might be needed.

It would therefore be desirable to provide a transportable facility that can provide such flexible, general-purpose capabilities. Such structures, systems and associated processes would provide a significant technical advance.

In addition, to the extent that the specialized needs of a particular deployment can be anticipated, the needs may not be well served by an inventory of specialized containers that are presently on hand, within an individual organization. Maintaining an extensive inventory of all specialized containers is highly impractical. The acquisition of specialized containers, such as on an as needed basis, is costly and time consuming, greatly increases expense, and reduces the responsiveness of an organization.

It would therefore be advantageous to provide structures, and associated systems and processes that allow for rapid reconfiguration of specialized equipment within general-purpose containers, prior to deployment. Such structures, systems and associated processes would provide a substantial technical advance.

SUMMARY OF THE INVENTION

An expeditionary module comprises one or more mission capabilities package (MCP) carts, wherein the expeditionary module provides a self-contained mission support system, which may preferably be configured to provide advanced capabilities, such as in remote and austere environments. In some exemplary embodiments, the exterior structure of the expeditionary module comprises a standard shipping container. One or more MCP carts are stowable within the exterior structure, on a track and rail system that runs longitudinally along the floor and ceiling of the exterior structure. The expeditionary module typically comprises a suite of standard equipment, to provide general-purpose functionality useful for a great majority of operations. Prior to deployment, one or more MCP carts may preferably be selected to meet the anticipated needs of the operation, and are readily loaded through the doorway and into the expeditionary module, via the track and rail system. Upon arrival at the operation location, personnel readily unload the MCP carts from the container, via the track and rail system. A versatile set of MCP cart-to-container attachments and/or and MCP cart-to-MCP cart attachments allows personnel to configure the MCP carts about the container in the field, in a wide variety of structurally sound configurations, as operational needs and environmental conditions dictate.

BRIEF DESCRIPTION OF THE DRAWINGS

FIG. 28 is a schematic depiction of different transportation mechanisms for expeditionary modules; and FIG. 29 shows different related structures and systems associated with the deployment of one or more expeditionary modules.

DETAILED DESCRIPTION OF PREFERRED EMBODIMENTS

Figure 1:
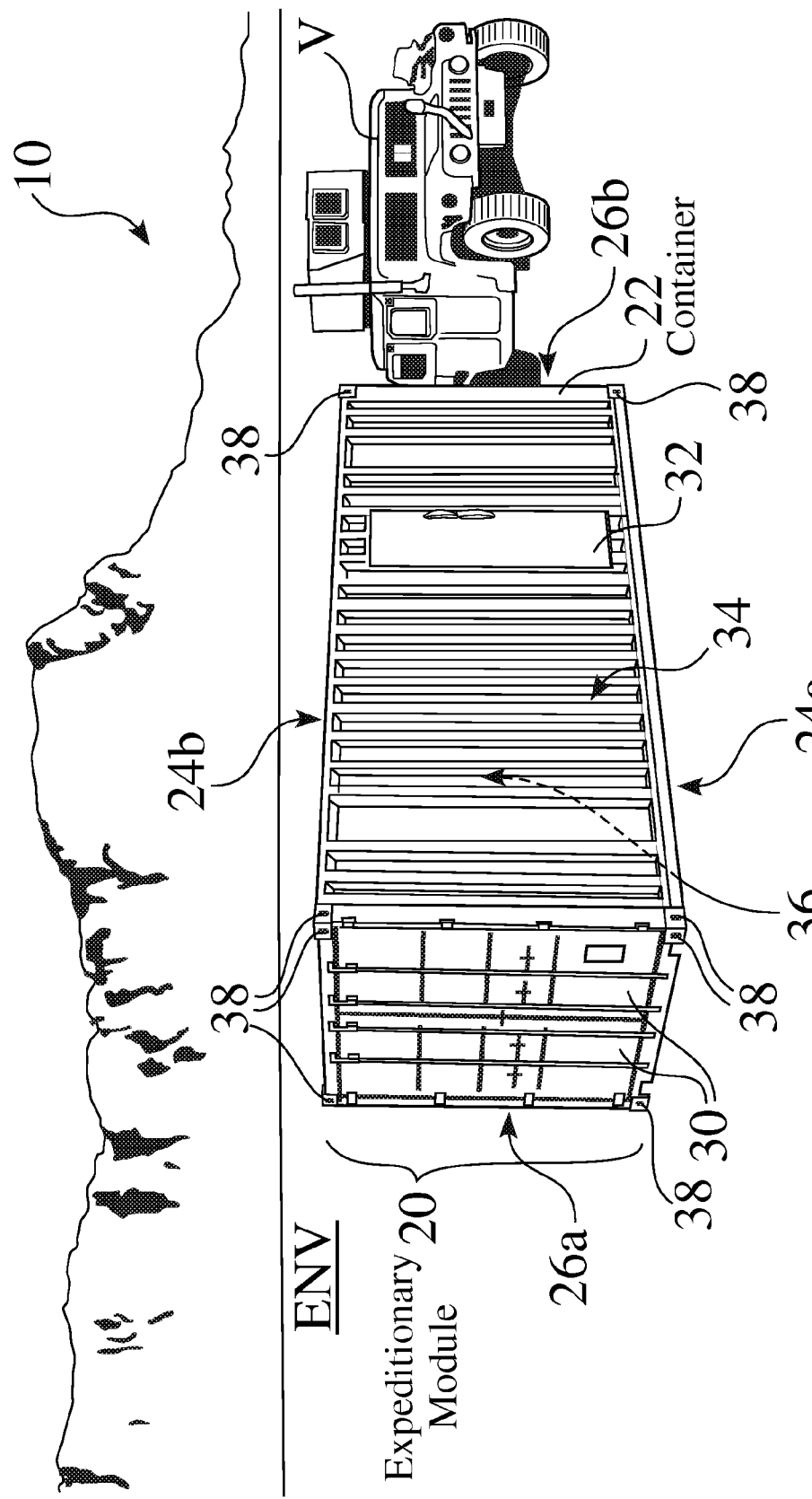
FIG. 1 shows an exemplary expeditionary module deployed in a remote and austere environment.
Figure 2:
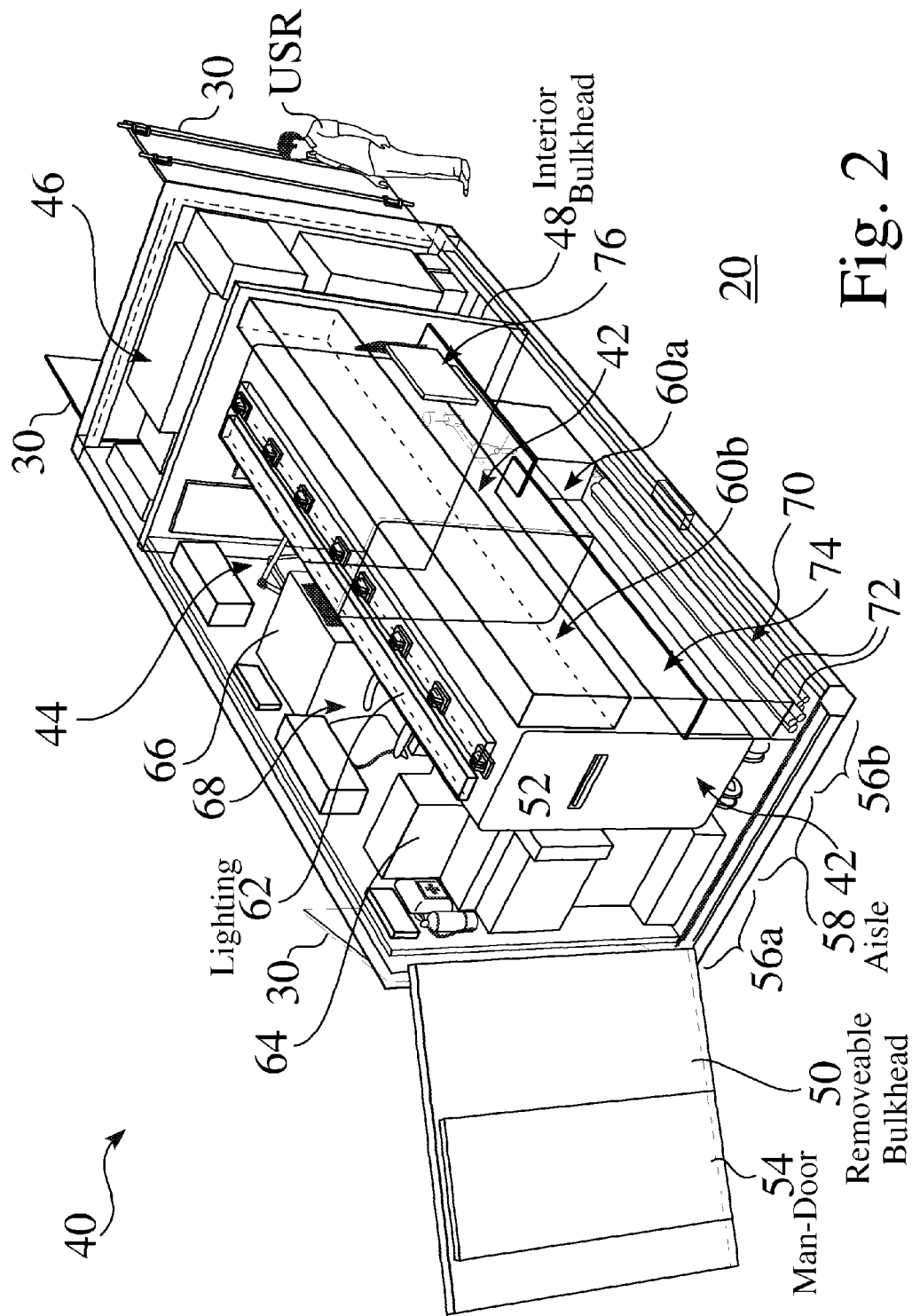
FIG. 2 is an isometric view of an expeditionary module with stowed mission capabilities package (MCP) carts.
Figure 3:
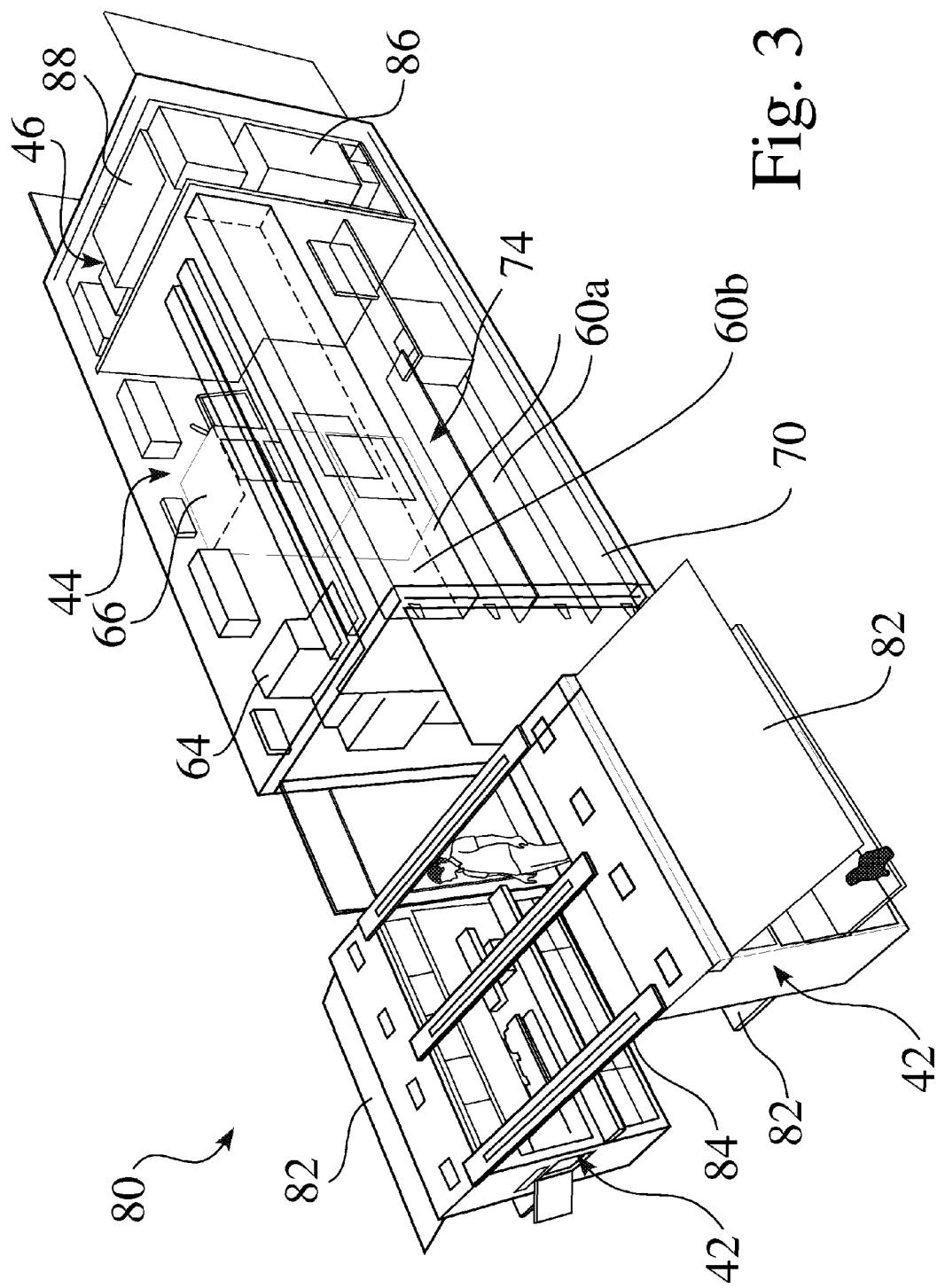
FIG. 3 is an isometric view of an expeditionary module with unloaded MCP carts.
Figure 4:
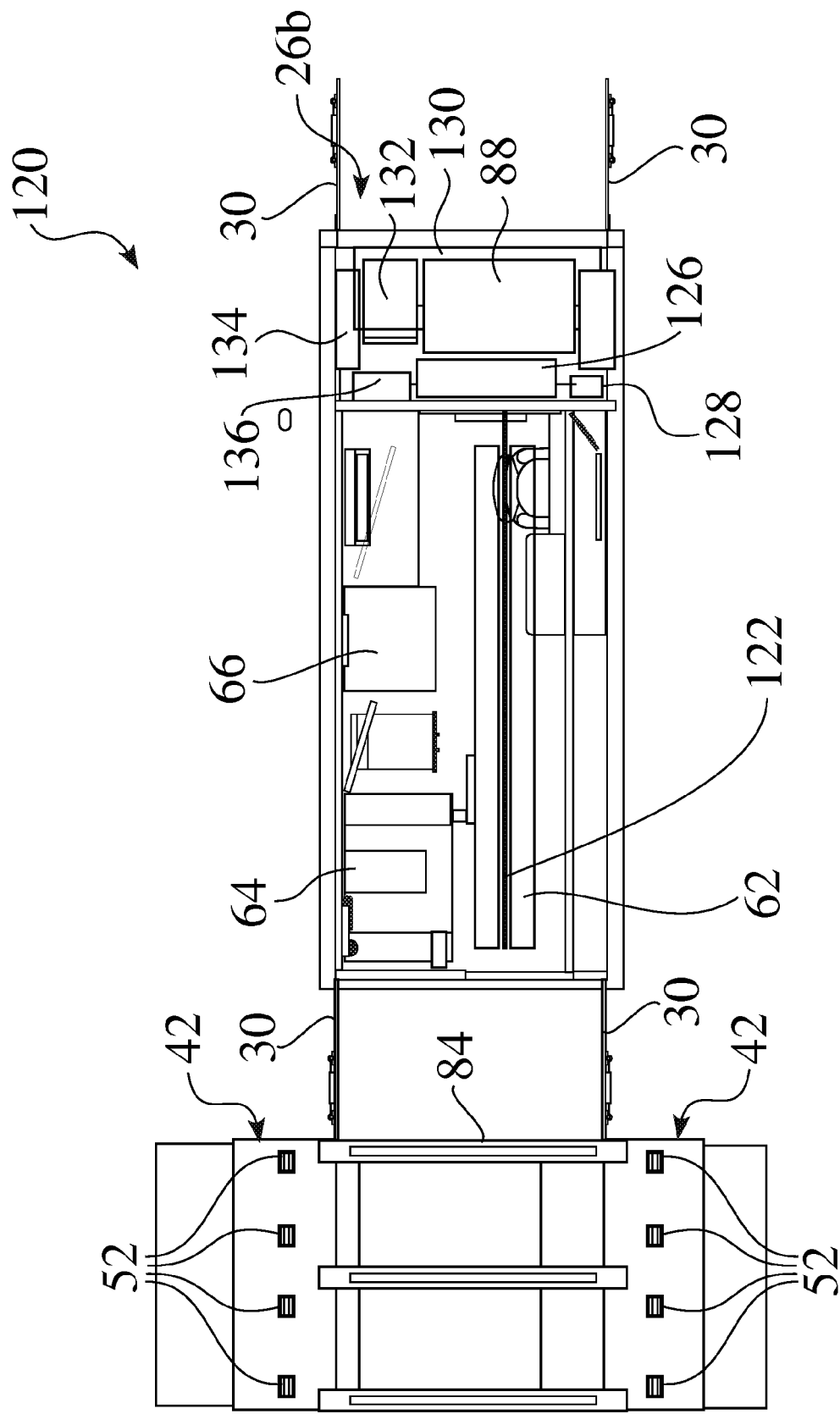
FIG. 4 is an overhead view of an expeditionary module with unloaded MCP carts.
Figure 5:
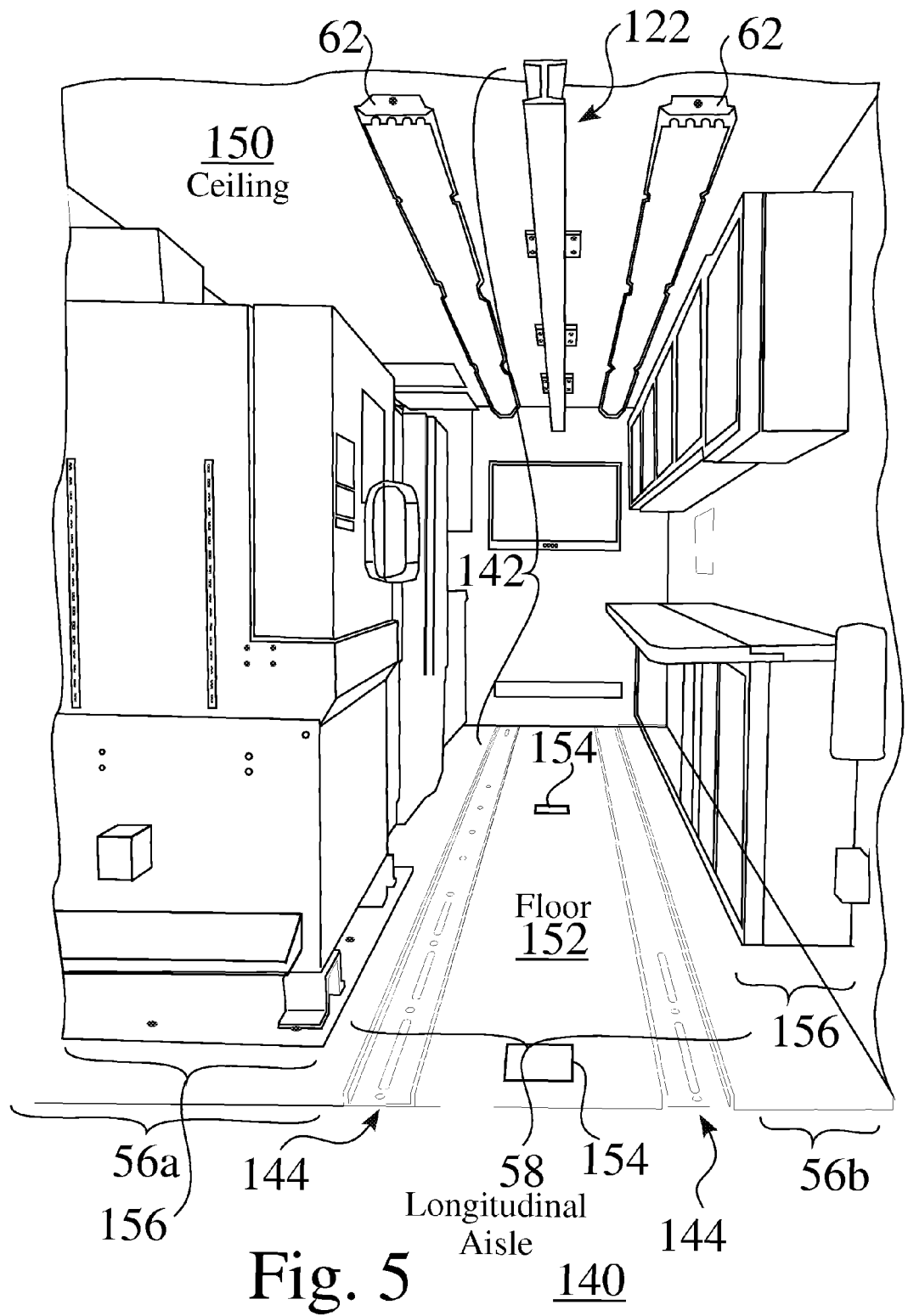
FIG. 5 shows a wide strip (left) and narrow strip (right) of standard equipment within the interior of an exemplary expeditionary module.

FIG. 1 is a schematic depiction 10 of an exemplary expeditionary module 20 deployed in a remote and austere environment ENV. FIG. 2 is a partial cutaway view 40 of an expeditionary module 20 with stowed mission capabilities package (MCP) carts 42. FIG. 3 is a partial cutaway view 80 of an expeditionary module 20 with unloaded MCP carts 42. FIG. 4 is an overhead view 120 of an expeditionary module 20 with unloaded MCP carts 42. FIG. 5 shows details 140 of the interior 36 of an expeditionary module 20, such as comprising groups 56, e.g. 56a, 56b of associated equipment, e.g. equipment that may be standardized for one or more expeditionary modules 20.

The expeditionary module 20 is configured to house and deploy one of more highly configurable MCP carts 42. The expeditionary module 20 may preferably be configured as a self-contained mission support system, such as to provide advanced capabilities. Expeditionary modules 20 can readily be transported to and deployed in a wide variety of environments ENV, such as but not limited to remote and austere environments ENV.

The exemplary expeditionary module 20 seen in FIG. 1 comprises an exterior container 22, having a container bottom 24a, and a container top 24b opposite the container bottom 24a. The container 22 extends from a first end 26a to a second end 26b opposite the first end 26a. One or more access doors 30 are typically provided at zo one or both ends 26, e.g. 26a, 26b. One or more side doors 32 may also be provided on one or both sides 34 of the container 22, such as to provide access to one or more portions of the interior 36 of the container 22. As well, the container 22 may preferably comprise a plurality of hold downs 38 defined at several locations around the exterior of the container 22, wherein the container may readily be secured during transportation, e.g. such as using any of rigging, chains, cables, ropes, straps, winches, grab hooks, come alongs, and/or snatch blocks.

A standard shipping container 22, also known as a steel intermodal container or an ISO container 22, may preferably provide the exterior structure 22 of the expeditionary module 20. Insulating panel structures, e.g. 240 (FIG. 8), 260 (FIG. 9), may preferably be suspended from the interior walls, such as to augment any of the thermal properties or the acoustic properties of the container 22.

The MCP carts 42 are stowable within the container 22, such as on a U-channel track and rail system 142 (FIG. 5), which runs longitudinally along the floor 152 and ceiling 150 of the container 22. To one or both sides 56, e.g. 56a,56b (FIG. 2, FIG. 5) of the longitudinal aisle 156 (FIG. 2, FIG. 5) that receives the MCP carts 42, the expeditionary module 20 may preferably comprise a suite of standard equipment 156 (FIG. 5), such as to provide general-purpose functionality useful for a great majority of operations.

Prior to deployment, one or more MCP carts 42 may preferably be selected to meet the anticipated specialized needs of an intended operation, and are readily loaded, such as through the doorway 30, into the interior 36 of the expeditionary module 20, via the U-channel track and I-beam rail system 142.

Upon arrival at the operation location ENV, personnel USRs readily unload the MCP carts 42 from the container 20, via the U-channel track and I-Beam rail system 142. A connection system 782 (FIG. 29), comprising a versatile set of structures and, as needed, associated hardware, such as but not limited to MCP cart-to-container attachment structures 784 (FIG. 29) and MCP cart-to-MCP cart attachment structures 786 (FIG. 29), allow the personnel USRs to configure the MCP carts 42 about the container 22 in the field ENV, in a wide variety of structurally sound configurations, e.g. 562a (FIG. 24), 562b (FIG. 25), 562c (FIG. 26), as operational needs and environmental conditions dictate.

In deployed configurations 562, the working space 564 (FIGS. 24-26) of the system 562 is greatly increased, over that available solely within the expeditionary module 20 itself. While the working space 564 within the interior workspace 44 of the expeditionary module 20 may readily be maintained as a protected, i.e. relatively "clean", environment, the working space 564 defined by the MCP carts 42 supports a wider variety of activities.

The expeditionary module 20 thus provides a containerized capability, which may readily be transported with minimal energy, to remote locations ENV, such as via an extensive civilian transportation infrastructure 742 (FIG. 28), e.g. air, sea, road, and or rail, which already exists for conventional shipping containers. The expeditionary module 20 may similarly be transported by standard military means, such as but not limited to any of fixed wing aircraft 744 (FIG. 28) or rotary wing aircraft 746 (FIG. 28).

The capabilities provided by the expeditionary module 20 can be easily and rapidly customized prior to deployment. As well, upon arrival at a desired location ENV, the expeditionary module 20 is readily and flexibly configured, to provide both general-purpose and specialized capabilities in the field. As also seen in FIG. 2, other equipment, such as but not limited to a CNC mill 64 and/or a prototyping machine 66, may readily be located within the interior workspace 44 of the container 22.

One or more storage areas 60, e.g. 60a, 60b, may preferably be provided within the interior workspace 44 of the expeditionary module 20. Additional storage 70 for materials 72 may also be provided, such as but not limited to a storage area 70 that is configured for long stock 72, such as under a workbench 74 and/or an electrical test bench 76. The material storage area 70 may preferably be raised above the floor 150 of the container 20, e.g. about 8" off the floor 150. The exemplary expeditionary module 20 seen in FIG. 2 has additional free space 68 for the storage of supplemental equipment, e.g. a chair, transit case, etc., even when the MCP carts 42 are stored within the aisle 58.

As seen in FIG. 2 and FIG. 5, the expeditionary module 20 typically includes lighting 62 at one or more locations within the interior workspace 44, such as but not limited to the longitudinal aisle region 58.

The two rollout MPC carts 42 seen in FIG. 2 further comprise roller guide assemblies 52 that are located on the top, which are lockable in relation to an I-Beam rail 122 (FIG. 4) that is mounted to the ceiling 150 of the interior workspace 44, wherein the I-Beam rail 122 is generally aligned with the longitudinal aisle 58. As seen in FIG. 4 and FIG. 5, the I-Beam rail 122 may preferably be mounted between longitudinally aligned lighting fixtures 62.

The exemplary expeditionary module 20 seen in FIG. 2 further comprises a removable bulkhead 50. For example, the removable bulkhead 50 may be configured to swing-out or lift-out, such as during system deployment. The removable bulkhead 50 may preferably comprise a man-door 54, which in some embodiments is large enough for unloading and/or loading of the MCP carts 42.

The exemplary expeditionary module 20 seen in FIG. 2 and FIG. 3 may preferably include a large variety of standard equipment, such as within one or more interior regions 56, e.g. 56a and/or 56b, or within a utility region 46, such as but not limited to any of:

air conditioning evaporator units and/or heat pumps;
a CNC mill 64;
a rapid prototyping machine, i.e. a "3-D printer" 66;
a 3-D scanner;
a touchscreen collaboration system;
safety equipment, e.g. first-aid kit and/or fire extinguisher;
storage cabinets (for tools and parts), e.g. 60b;
a workbench 74;
a computer VTC station, and/or
other storage cabinets 60, e.g. 60a,60b.

As shown in FIG. 3 and FIG. 4, in some preferred embodiments of the expeditionary module 20, a utility space 46 of the interior 36, beyond an interior bulkhead 48, houses any of:

an air conditioning compressor 88;
an air dryer 128;
one or more generators 86, e.g. a water-cooled diesel generator 86;
a battery bank; and/or
power management equipment facilitating either on-board or off-board power generation, i.e. shore power connection for extended operations).

Along and within any of the floor 152, ceiling 150, and/or walls of the container 22, is equipment and structures, comprising any of:

fiber and copper data distribution 808 (FIG. 29);
unclassified and classified broadband connectivity 810 (FIG. 29);
high-efficiency thermal insulation, e.g. 246 (FIG. 8, FIG. 9); and
high-efficiency white and NVIS LED lighting.

This configuration of standard equipment provides personnel USRs with a base set of general-purpose capabilities. In particular, the container structure and the equipment housed within provide a secure and comfortable environment in which personnel USRs is can effectively communicate, design, prototype, and machine the ideas and parts needed to keep a remote mission operating.

As seen in FIG. 3, some embodiments of the MCP carts 42 may comprise one or more flip-down workbenches 82 for exterior work, such as for but not limited to any of cutting, grinding, welding, pipefitting, sheet metal work, or other fabrication. For example, the flip-down workbench seen in FIG. 3 may include one or more vises, and a portable band saw, e.g. a portaband. The MCP carts 42 may also include electrical connections, e.g. AC and/or DC power receptacles, such as to connect a wide variety of tools or devices. Some MCP carts 42 may include removable solar panels, which act as covers during transit.

Some embodiments of MCP carts 42 may preferably include storage on one or both sides of the MCP cart 42, depending on type of MCP cart 42. For example, the MCP carts 42 seen in FIG. 3 may include a storage rack for material stock, e.g. tubing and/or solid materials. Similarly, MCP carts 42 may include storage bins for tooling and stock material.

As noted above, a portion of the container interior 36 may preferably house a suite 156 (FIG. 5) of standard equipment that provides general-purpose capabilities. Preferably, this equipment may preferably be arranged in a linear fashion on both sides 56, e.g. 56a,56b, of the aisle 58 that receives the MCP carts 42, such as configured in functional "strips" on either side of the aisle 58.

In a currently preferred embodiment of the expeditionary module 20, a wide strip 56a on one side of the aisle 58 spans approximately two-fifths of the width of the container interior 36, while the aisle 58 spans approximately two-fifths of the width of the container interior 36, and a narrow strip 56b on the other side of the aisle 58 spans approximately one-fifth of the width of the container interior 56. The MCP cart aisle 58 and strips 56 may preferably run approximately four-fifths of the length of the container 22, away from the doorway 30, through which the MCP carts 42 may preferably be loaded.

Figure 6:
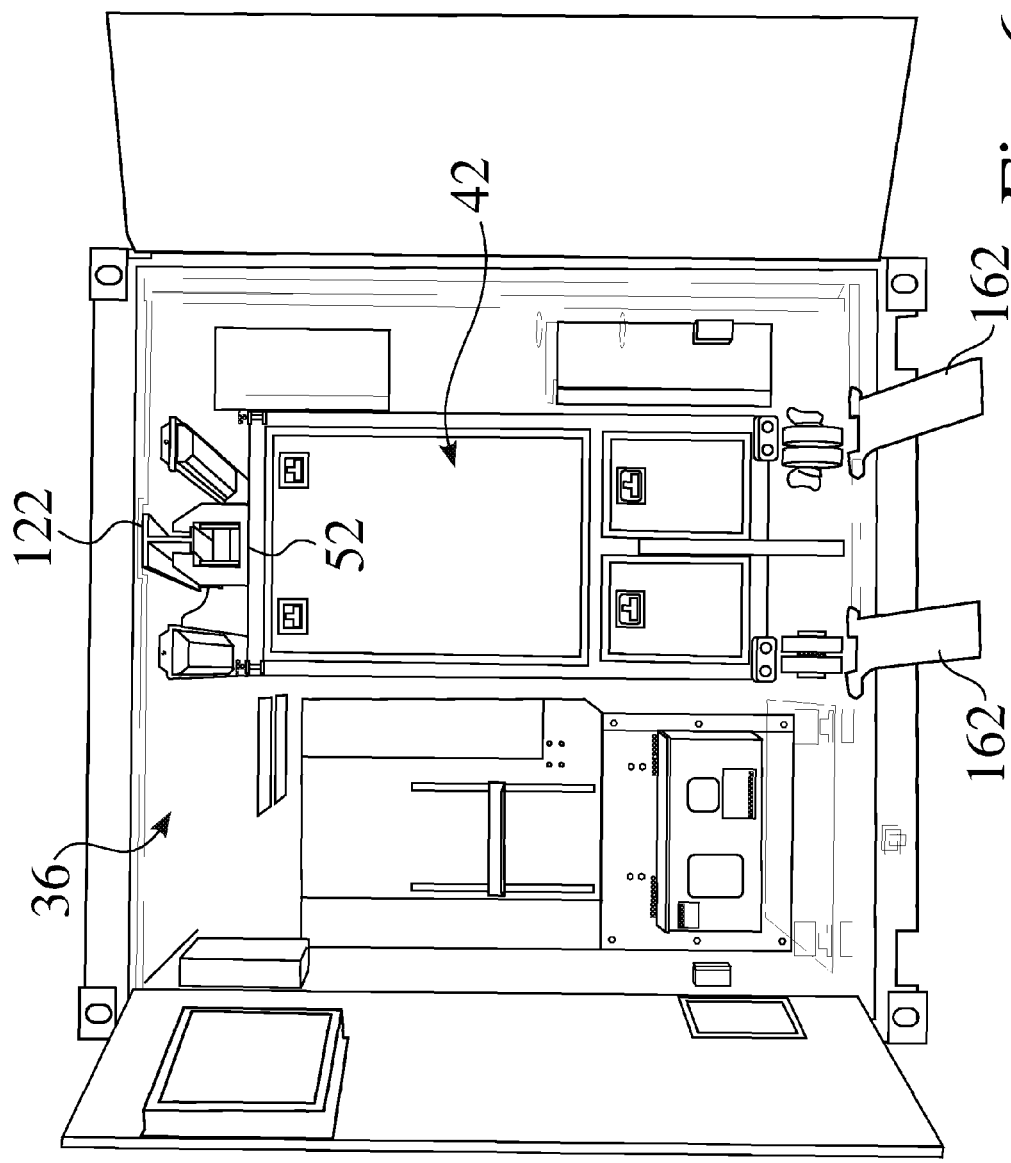
FIG. 6 shows MCP carts stowed within the interior of an exemplary expeditionary module.

FIG. 6 is a schematic view 160 that shows MCP carts 42 stowed within the interior 36 of an expeditionary module 20, wherein the roller guide assemblies 52 are affixed to the I-Beam rail 122, and wherein casters 400 on the bottom of the MCP carts 42 are confined within the U-channel tracks 144. As well, a lower locking mechanism 462 (FIG. 19) may preferably be affixed to both the MPC carts 42 and to the floor 152 of the expeditionary module 20.

Figure 7:
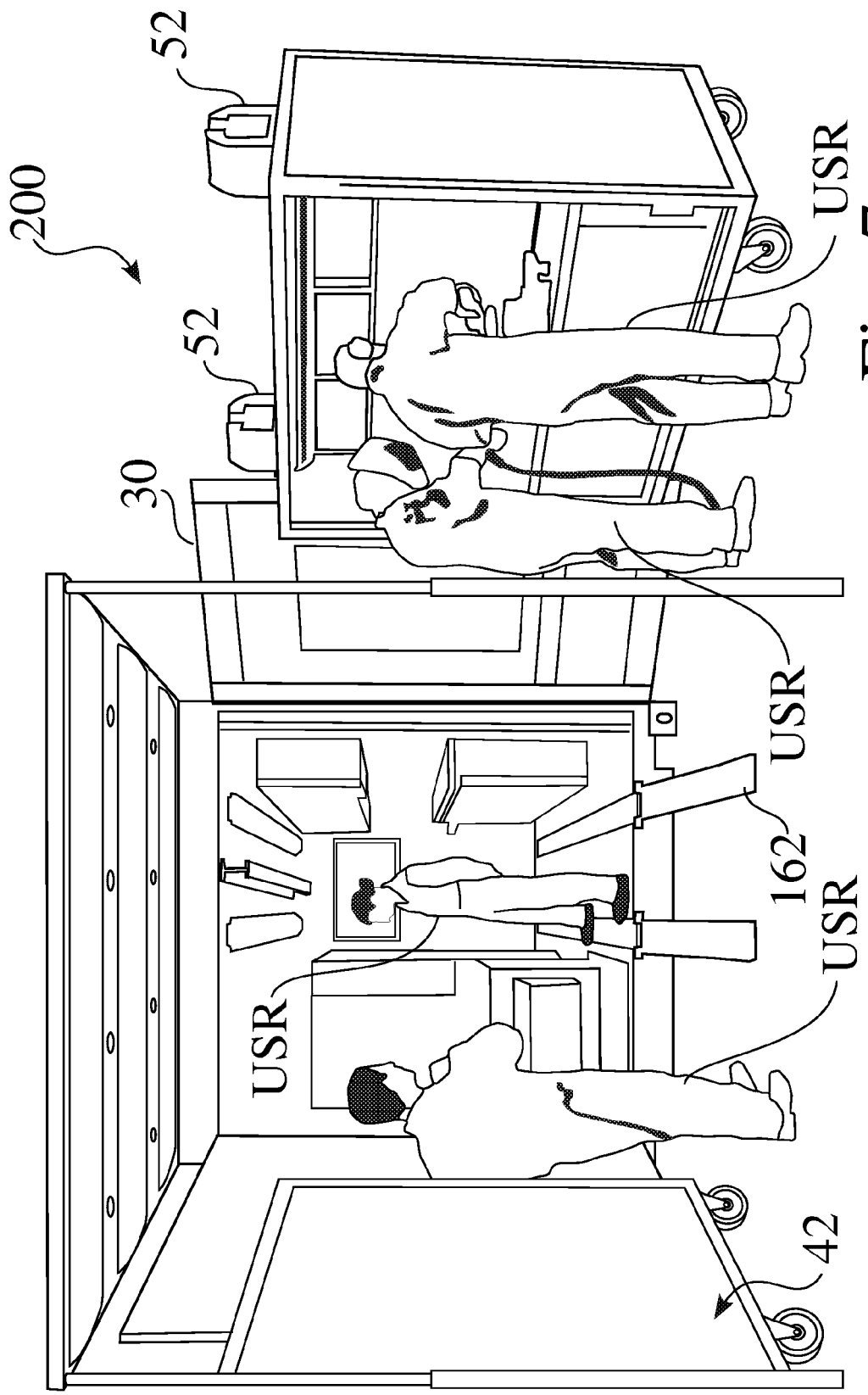
FIG. 7 shows personnel working inside (within the MCP cart aisle) and outside an exemplary expeditionary module (on MCP carts)

As noted above, one or more MCP carts 42 may readily be moved out from the interior 36 of the expeditionary module 20, and placed into service, which also frees up the interior workspace of the expeditionary module 20. For example, FIG. 7 shows personnel USR working both inside, an expeditionary module 20, within the MCP cart aisle 58, and outside the expeditionary module 20, such as at one or more MCP carts 42.

Figure 8:
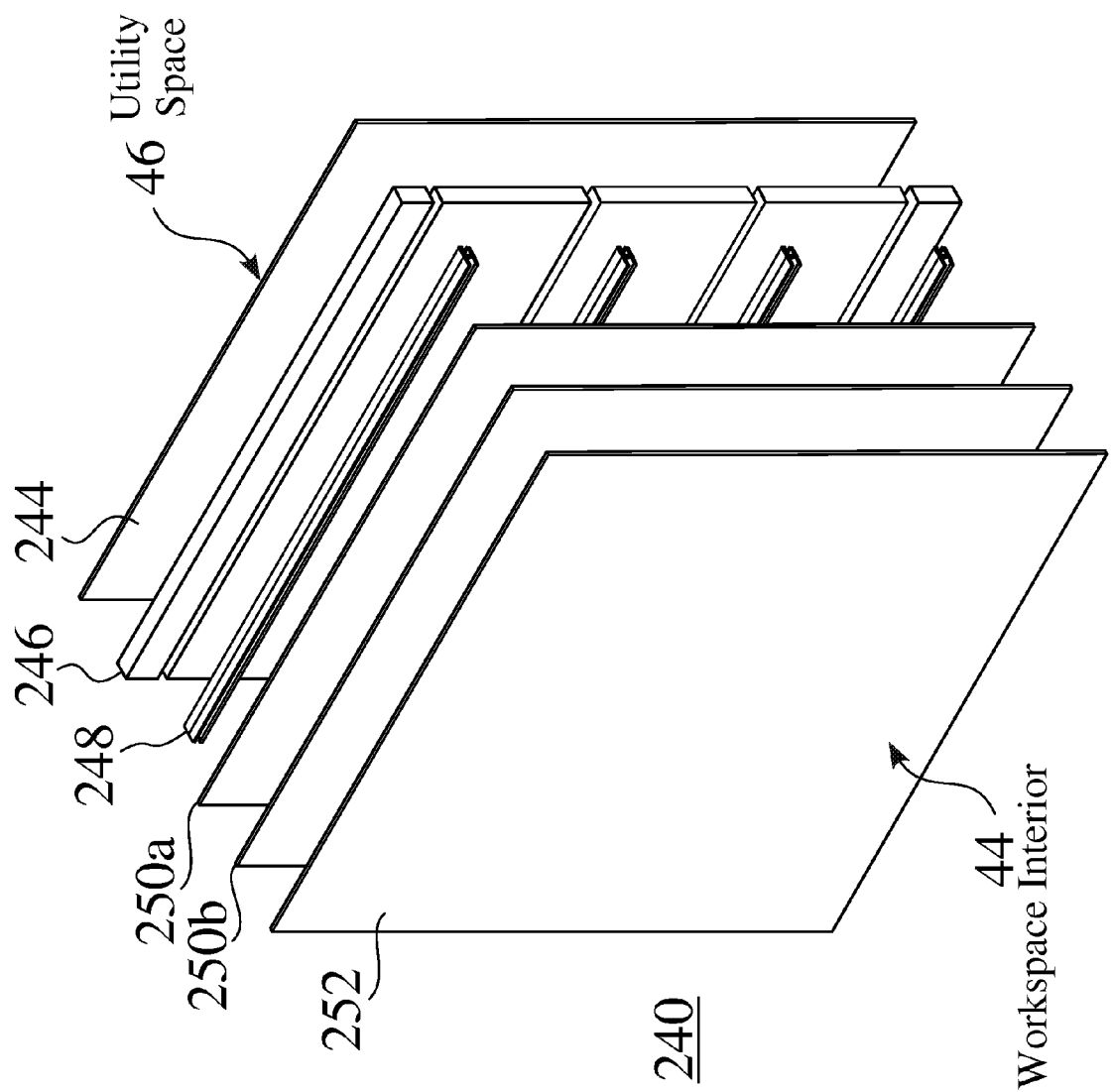
FIG. 8 is an exploded diagram of bulkhead construction.

Exemplary Construction Details for Expeditionary Modules. FIG. 8 is an exploded diagram of exemplary bulkhead construction 240 for an expeditionary module 20, such as for an interior bulkhead 48 that is located between the interior workspace 44 and a utility workspace 46 (FIG. 2, FIG. 3). For example, the interior bulkhead 48 may preferably be located at the end of the standard equipment strips 56, e.g. 56a, 56b, and MCP cart aisle 58, opposite the doorway 30.

The interior bulkhead 48 may preferably be preferably constructed from several material layers, to provide maximal acoustic and thermal isolation between the utility space 46 and the remainder of the container interior 36. For example, the bulkhead construction 240 seen in FIG. 8 comprises a fiberglass sheet 244, e.g. having a thickness of 0.25 inch, proximate the utility space 46. The fiberglass sheet is mounted to one side of double-sided strut channel 248, which is affixed to 0.5" thick Baltic birch plywood 252, having an FRP skin, which is proximate the workspace interior 44.

The interior bulkhead 48 also typically comprises flame suppression/insulation material 246, e.g. 3.0 inch polyurethane flame suppression/insulation 246, in the region defined by the strut channel 248, between the fiberglass sheet 244 and the Baltic birch plywood 252. The interior bulkhead 48 may preferably further comprise one or more layers 250, e.g. 250a,250b, of noise suppression material, such as between the strut channel 248 and the Baltic birch plywood 252.

In a current embodiment of the expeditionary module 20, approximately one-fifth of the length of the container interior 36 beyond the interior bulkhead 48, shown as the utility space 46 in FIG. 2, houses equipment that generates noise and heat. The interior bulkhead 48 may therefore preferably be configured to insolate the utility space 46 from the remainder 44 of the container interior 36. The exact location of the interior bulkhead 48 can be adjusted, based on the amount of equipment that must be housed within the utility space 46.

A secondary set of doors 30 at the bulkhead end 26b of the container 22 provides access to equipment within the utility space 46, such as for any of installation, maintenance and replacement purposes. In some embodiments, the doors 30 proximate the utility space 46 are ventilated.

Figure 10:
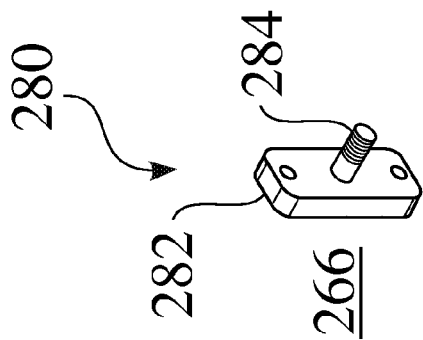
FIG. 10 is a detailed view of an exemplary weld stud thermal spacer.
Figure 9:
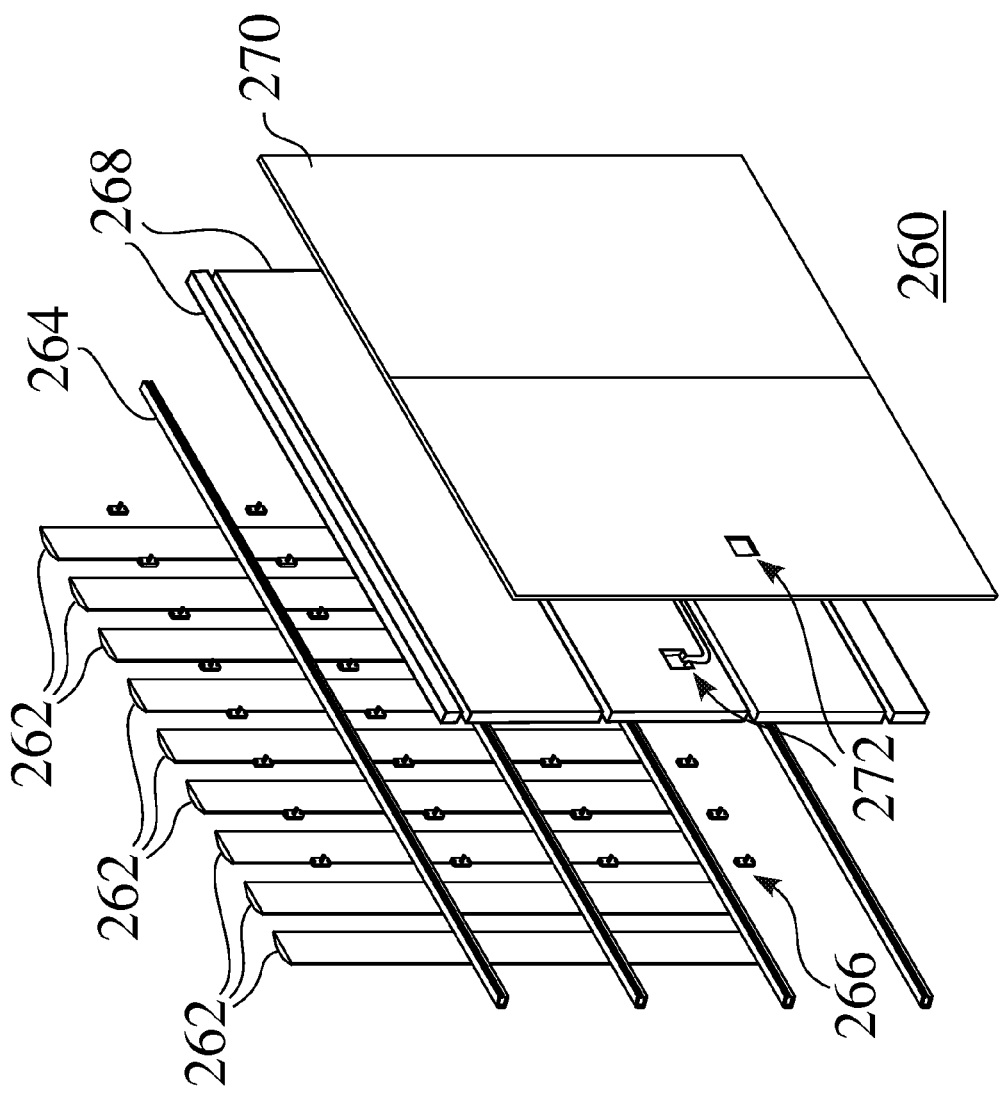
FIG. 9 is an exploded diagram of container exterior wall construction.

FIG. 9 is an exploded diagram of container exemplary exterior wall construction 260 for an expeditionary module 20. As seen in FIG. 9, a plurality of filler material 262, such as comprising but not limited to 1-inch thick polyurethane flame suppression insulation 262, may be affixed to the interior wall surfaces of the container 22, i.e. facing the interior 36. As the container may typically comprise corrugated steel panel construction, the filler material 262 may preferably be configured to fill the interior facing surfaces of the corrugated panels of the container 22. Single strut channel 264 is then affixed to the corrugated panels of the container 22. In some current exemplary embodiments of the exterior wall construction 260, the single strut channel 264 comprises Unistrut Model No. P1000, available through Unistrut Service Co., of Cleveland, Ohio. The exterior wall construction 260 may further comprise weld stud thermal spacer assemblies 266, such as shown 280 in FIG. 10, wherein the assemblies 266 may preferably comprise thermal spacers 282, e.g. 0.5 inch think nylon, having weld studs 284, e.g. ⅜ inch-16, extending therefrom. Inner wall panels 270, such as facing the workspace interior 44, are attached to the strut channel 264. In some embodiments, the inner wall panels 270 may preferably comprise 0.5" thick Baltic birch plywood 270, having an FRP skin. The walls 260 also typically comprise flame suppression/insulation material 268, e.g. 2.0 inch polyurethane flame suppression/insulation 268, in the region defined by the strut channel 264, such as between the filler material 262 and the Baltic birch plywood 270. The walls 260 may be configured 274 for AC power conduit and receptacles, such as within the wall or mounted on the interior-facing surface of the inner wall panels 270.

Figure 11:
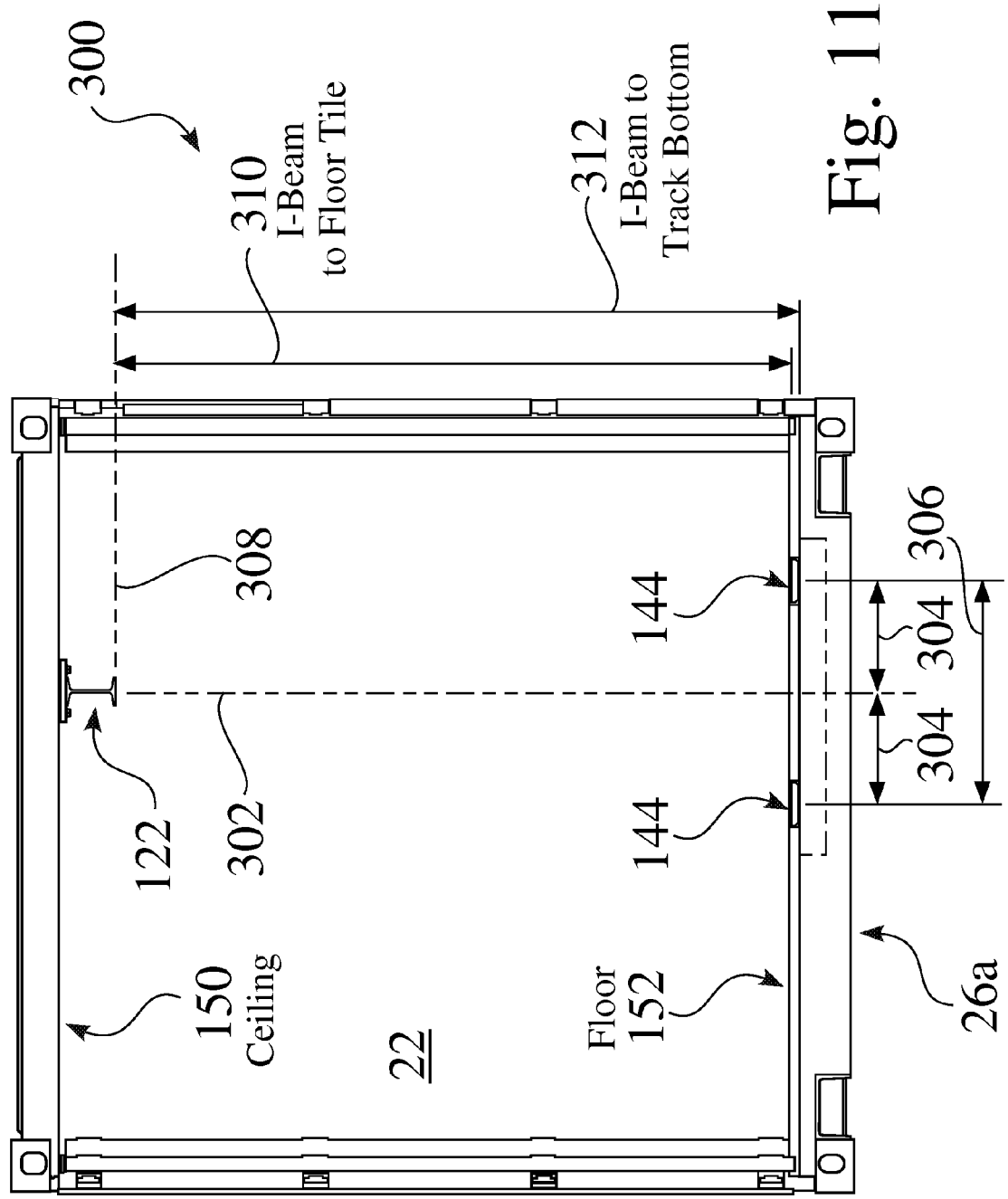
FIG. 11 shows an exemplary relationship between two U-channel tracks along the floor and an I-Beam rail along the ceiling of an exemplary expeditionary module.

FIG. 11 is an end view of a container 22, which shows an exemplary relationship between two U-channel tracks along the floor 152 and an I-Beam rail 122 along the ceiling 150 for an exemplary expeditionary module 20. For example, the I-Beam rail 122 in FIG. 11 is mounted to the ceiling 150 of the container 22, and extends longitudinally from the first end 26a into the workspace 44 of the interior 36 of the container 22, toward the second end 26b. The expeditionary module 20 also comprises two U-channel tracks 144, recessed within the floor 152 of the container 22, which extend longitudinally from the first end 26a into the workspace 44 of the interior 36 of the container 22, toward the second end 26b.

The exemplary U-channel tracks 144 shown in FIG. 11 are parallel to and are spaced equidistantly 304, e.g. 13.5 inches, from the centerline 302 of the I-Beam rail 122, wherein the centerline of the respective U-channel tracks 144 are spaced 306, e.g. 27.0 inches, from each other. The bottom rolling surface, i.e. the track bottom 332 (FIG. 12), is located a distance 312, e.g. 82.59 inches, below the lower edge of the I-Beam rail 122. The top of the floor surface 152, is located a distance 31, e.g. 81.83 inches, below the lower edge of the I-Beam rail 122.

is The exemplary geometric relationships shown in FIG. 11, such as between the I-Beam rail 122 and the U-channel tracks 144, provides ingress, egress, and stowage for one or more MCP carts 42, such that the casters 400 of the MCP carts 42 may move or be located within the U-channel tracks 144, while the roller guide assemblies 52 may move or be locked in relation to the I-Beam rail 122.

Figure 12:
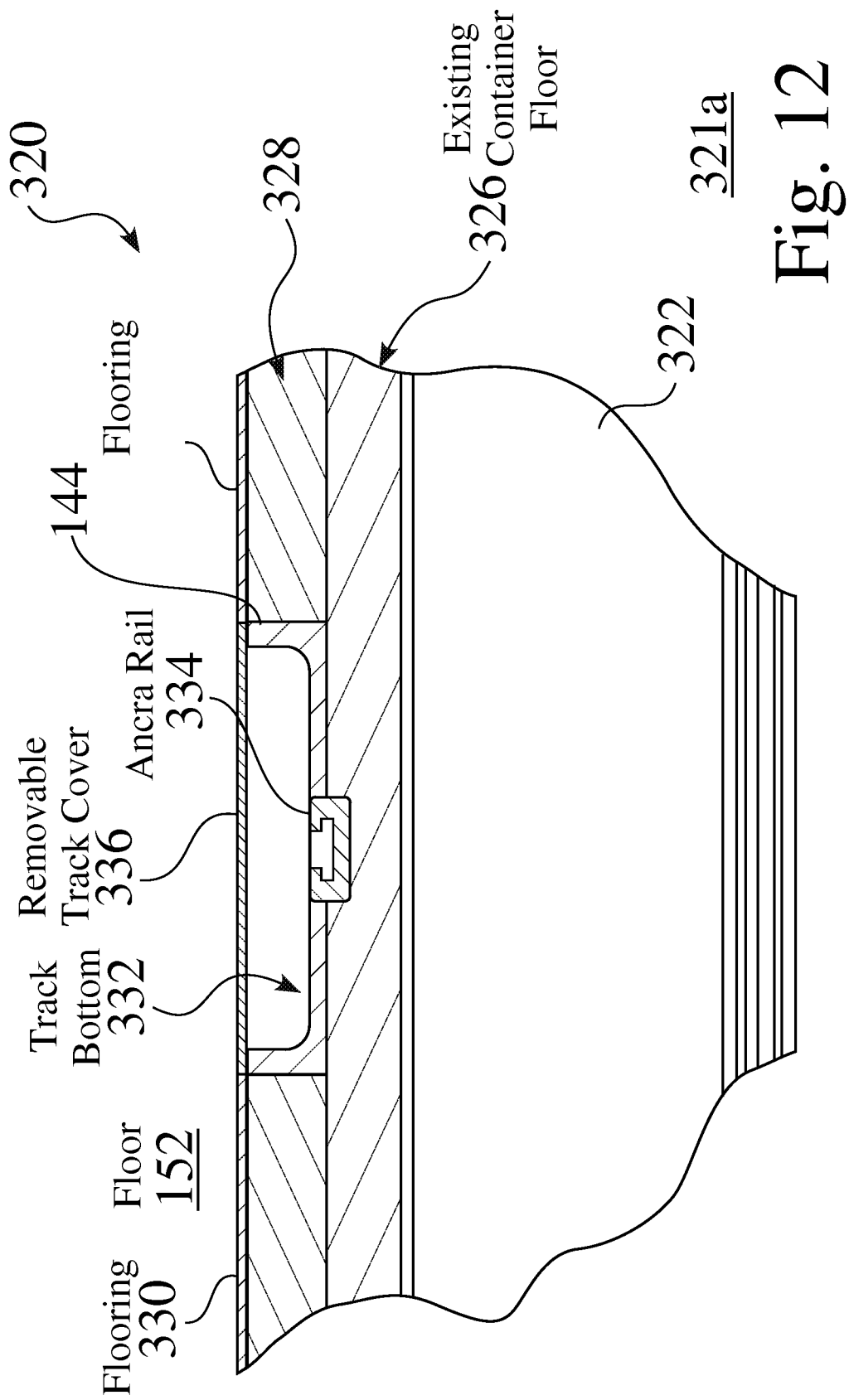
FIG. 12 shows a first embodiment/method for affixing U-channel tracks to the floor of an exemplary expeditionary module.

FIG. 12 is a detailed partial cutaway view 320 of a first embodiment 321a for affixing U-channel tracks 144 to the floor 152 of an expeditionary module 20. As seen in FIG. 12, a first floor layer 326, such as but not limited to an existing container floor 326, is affixed to a lower container frame 322. A second floor layer 328, e.g. 1 inch thick plywood 328, may preferably be added to the top of the first floor layer 326, and floor tile or mat 330, such as but not limited to textured rubber matting 330, may be affixed to the top of the second floor layer 328. The exemplary U-channel tracks 144 seen in FIG. 12 extend downward from the floor surface 152, such as located on top of the first floor layer 326. The U-channel tracks 144 seen in FIG. 12 further comprise a mounting rail 334, e.g. an ANCRA™ rail 334, inset into the track bottom 332. The structure 321a may preferably further comprise a removable track cover 336 that may be placed on top of a respective U-channel track 144, such as when the MCP carts 42 are removed from the interior workspace 44 of the expeditionary module 30, wherein the track cover 336 may have a suitable thickness and height to generally match the flooring 330, so that personnel USRs can readily move about and work within the interior workspace 44.

Figure 13:
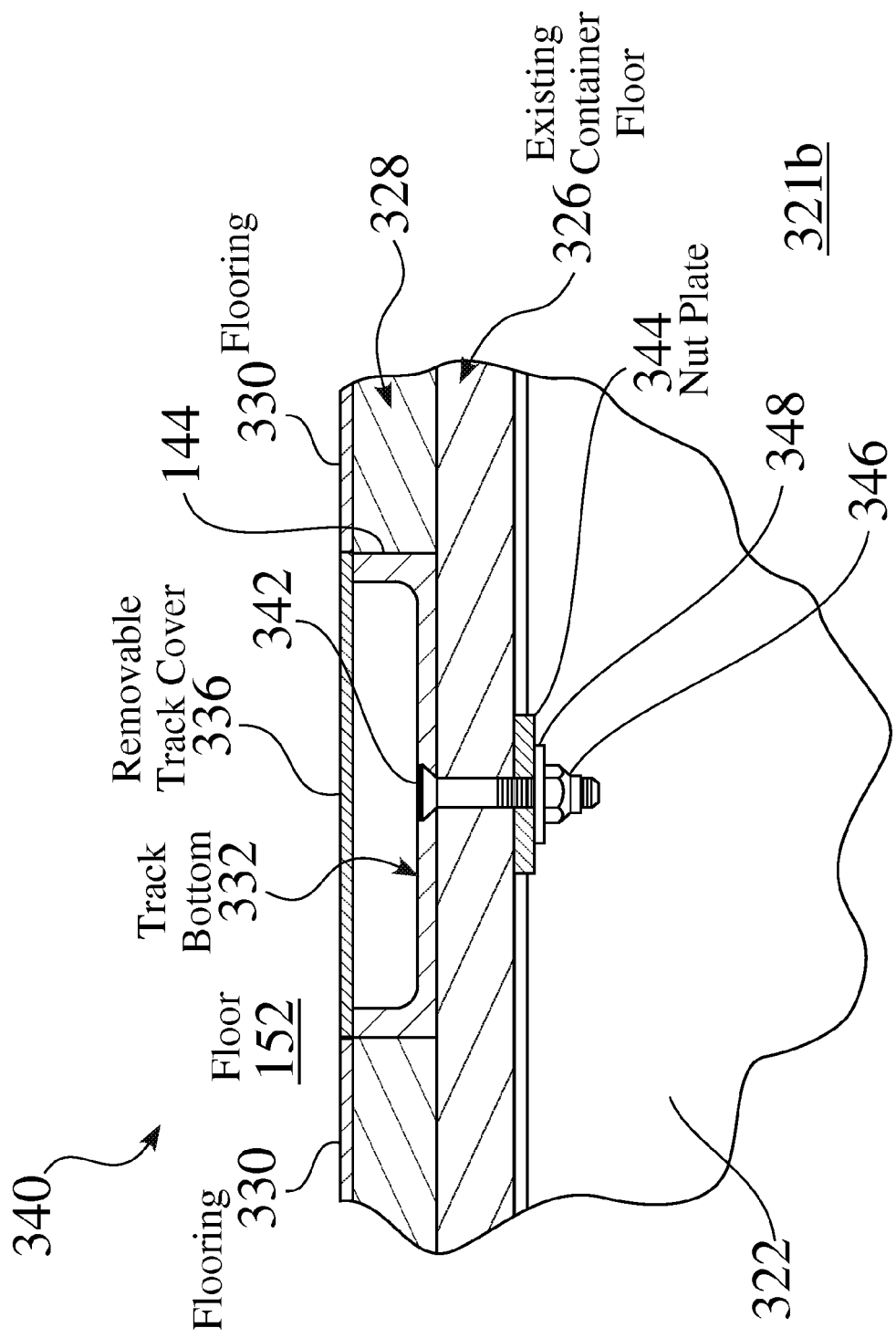
FIG. 13 shows a second embodiment/method for affixing U-channel tracks to the floor of an exemplary expeditionary module.

FIG. 13 is a detailed partial cutaway view 320 of a second embodiment 321b for affixing U-channel tracks 144 to the floor 152 of an expeditionary module 20. As seen in FIG. 13, a first floor layer 326, such as but not limited to an existing container floor 326, is affixed to a lower container frame 322. A second floor layer 328, e.g. 1 inch thick plywood 328, may preferably be added to the top of the first floor layer 326, and floor tile or mat 330, such as but not limited to textured rubber matting 330, may be affixed to the top of the second floor layer 328. The exemplary U-channel tracks 144 seen in FIG. 13 extend downward from the floor surface 152, such as located on top of the first floor layer 326. The U-channel tracks 144 seen in FIG. 13 further comprise threaded fasteners 342, e.g. ⅜-16×2.25 inch long flat head socket screws 342, which each extend through the track bottom 332, through a corresponding nut plate 344, and are thread ably fastened to a corresponding nut 346, e.g. ⅜-16 nut 346, wherein the nut 346 may have a corresponding washer 348, e.g. a ⅜ inch plain washer 348. The second structure 321b may further comprise a removable track cover 336 that may be placed on top of a respective U-channel track 144, in a similar manner similar to that of the first floor structure 321a.

Figure 14:
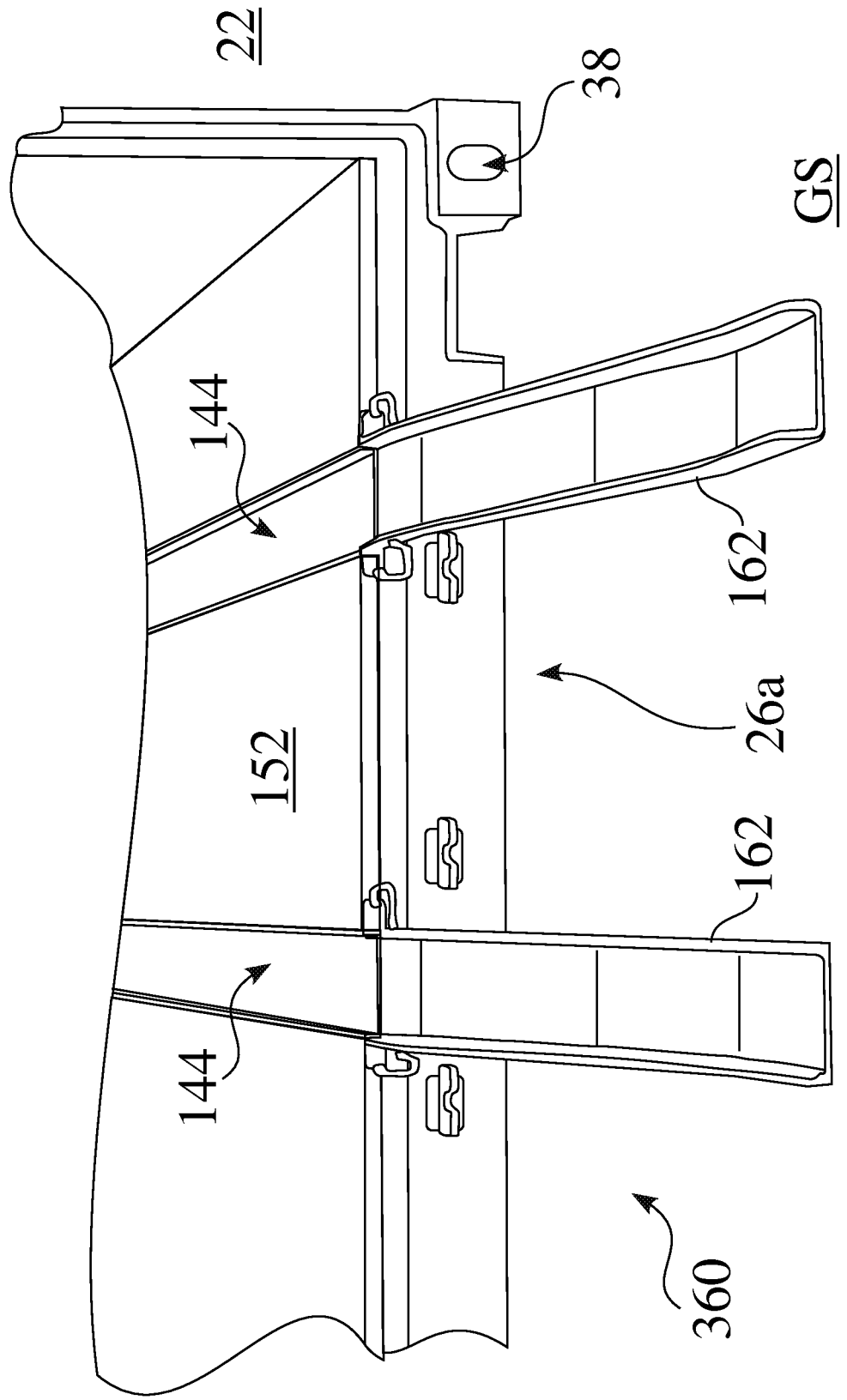
FIG. 14 shows U-channel ramps that are configured to transition between the ground and the interior floor of an exemplary expeditionary module.

FIG. 14 is a detailed view 360 showing exemplary U-channel ramp extensions 162 that may preferably be used to transition between a neighboring ground surface GS and the interior floor 150 of an expeditionary module 20. The U-channel ramp extensions 162 seen in FIG. 14 may preferably be affixed to the expeditionary module 20, at the end of the U-channel tracks 144, to provide a smooth transition across the height differential between the interior floor of the container and an exterior ground surface GS. As seen in FIG. 14, the profile of the U-channel ramp extensions 162, i.e. the width and height, may preferably be similar to that the U-channel tracks 144, particularly at the end of the U-channel ramp extensions 162 proximate the U-channel tracks 144, wherein the MCP carts 42 may readily be moved either out from the expeditionary module 20, or into the expeditionary module 20.

Figure 15:
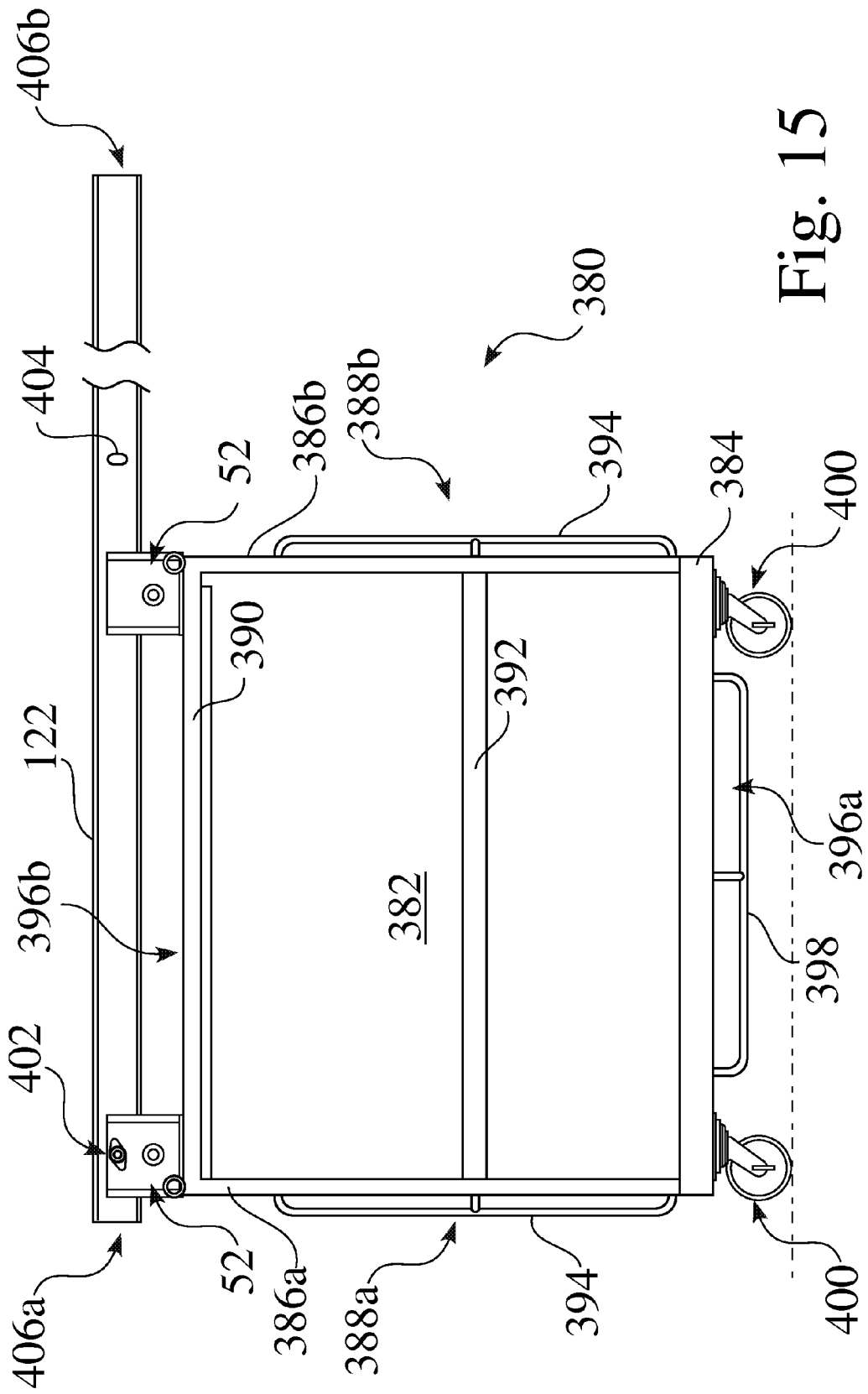
FIG. 15 is an exemplary view of an MCP cart frame with roller guide assemblies that are configured to engage an I-Beam rail.
Figure 16:
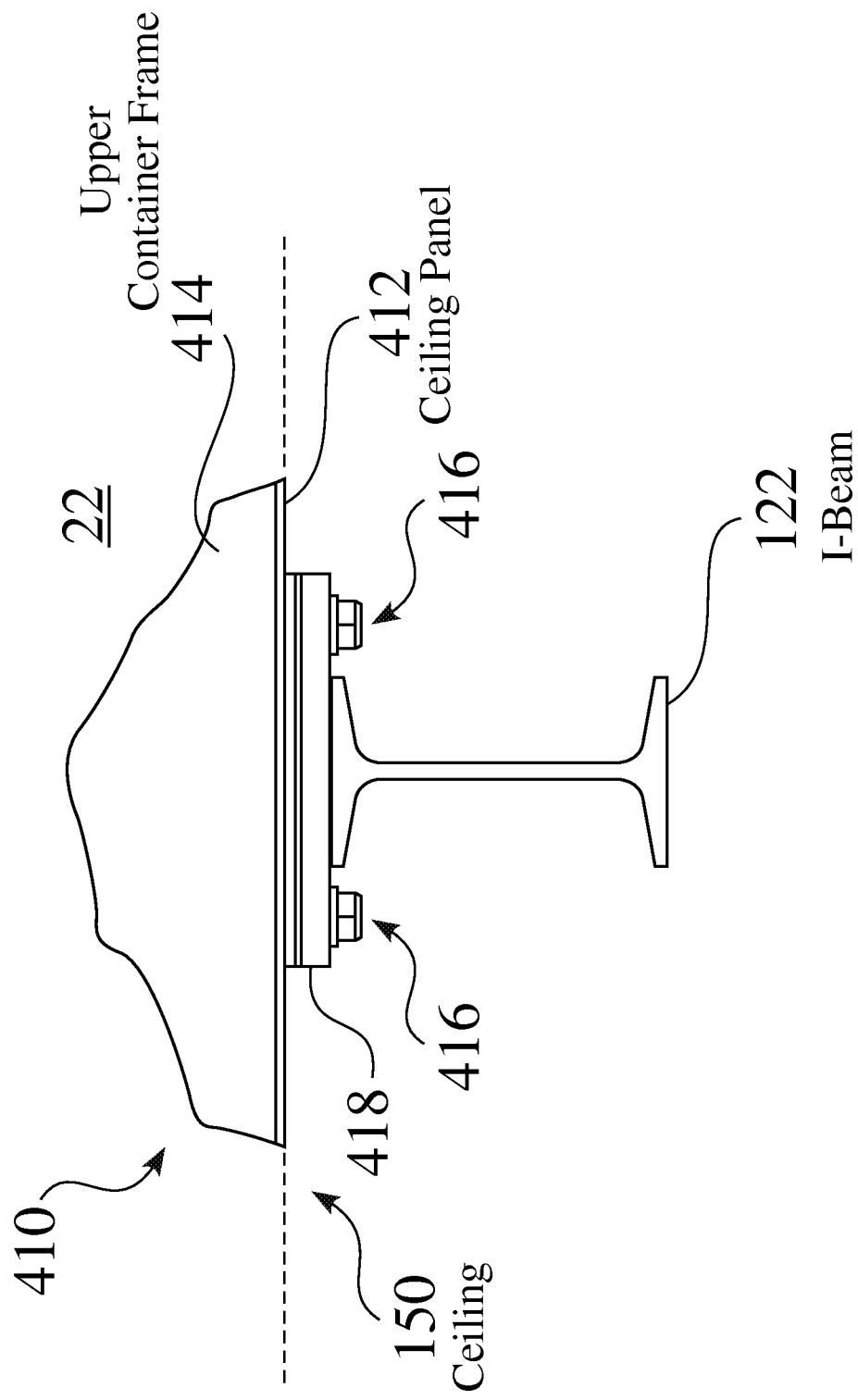
FIG. 16 shows an I-beam rail mounted to the ceiling of an exemplary expeditionary module.

FIG. 15 is a schematic view 380 of an exemplary MCP cart frame 382 for an MCP cart 42, with roller guide assemblies 52 that are configured to engage the I-Beam rail 122. FIG. 16 is a detailed partial cutaway view 410 of an I-beam rail 122 mounted to the ceiling 150 of an expeditionary module 20.

The exemplary MCP cart frame 382 seen in FIG. 15 comprises a bottom frame member 384, a top frame member 390, and a plurality of vertical frame members 386, e.g. 386*a*, 386*b*, which extend from the bottom frame member 384 to the top frame member 390. The MCP cart frame 382 may further comprise additional frame members 392, such as for to strengthen the frame structure 382, and/or to provide a framework for additional construction, such as for but not limited to any of workbench tops, drawers, or cabinets.

At the bottom 396*a* of the MCP cart frame 382, the MCP carts 42 comprise a mechanism 400 for movement, such as but not limited to wheels or glide plates 400, e.g. low-friction glide plates 400. In some current embodiments of the MCP carts 42, MCP cart frame 382 includes at least four wheels 400, e.g. one wheel 400 at each corner of a rectangular bottom frame 384. Wheels 400 may preferably comprise any of single or dual wheels, castered or non-castered wheels. In some embodiments, two wheels 400 at one end 388, e.g. 388*a*, of the MCP cart frame 382 may preferably comprise non-castered wheels 400, while two wheels at the opposite end 388, e.g. 388*b*, of the MCP cart frame 382 may preferably comprise castered wheels 400. In some current embodiments of the MCP cart frame 382, the wheels comprise castered, urethane wheels 400 at each of the four bottom corners of the MCP cart 42.

The exemplary MCP cart frame 382 seen in FIG. 15 also comprises one ore more rail structures 394 affixed to one or more of the vertical frame members 386, and/or one or more bottom rail structures 398, such as to provide any of handles, tie downs, or mounts.

The exemplary MCP cart frame 382 seen in FIG. 15 is configured to engage a ceiling-mounted I-beam rail 122, with one or more, e.g. two, roller guide assemblies 52, which are rigidly connected to the top 396*b* of the cart frame 382. The exemplary I-Beam rail 122 seen in FIG. 16 may preferably comprise one or more mounting plates 418 affixed, e.g. welded to the I-beam rail 122. Threaded fasteners 416 extend through corresponding holes defined through the mounting plates 418, and are typically affixed to the upper frame 414 of the container 22, such as through a ceiling panel 412.

Figure 17:
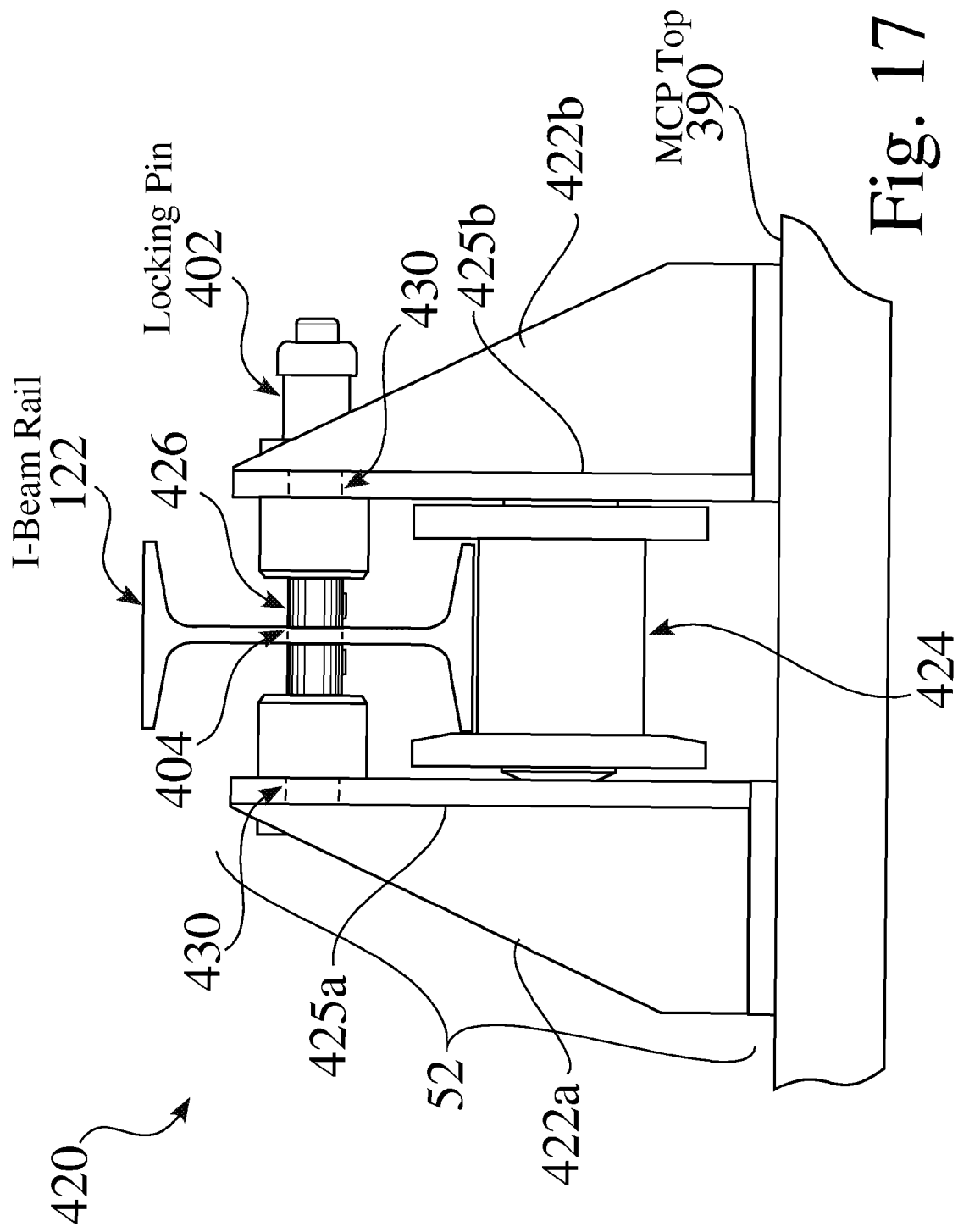
FIG. 17 is an end view of an exemplary trolley with a locking pin engaging an I-beam rail.
Figure 18:
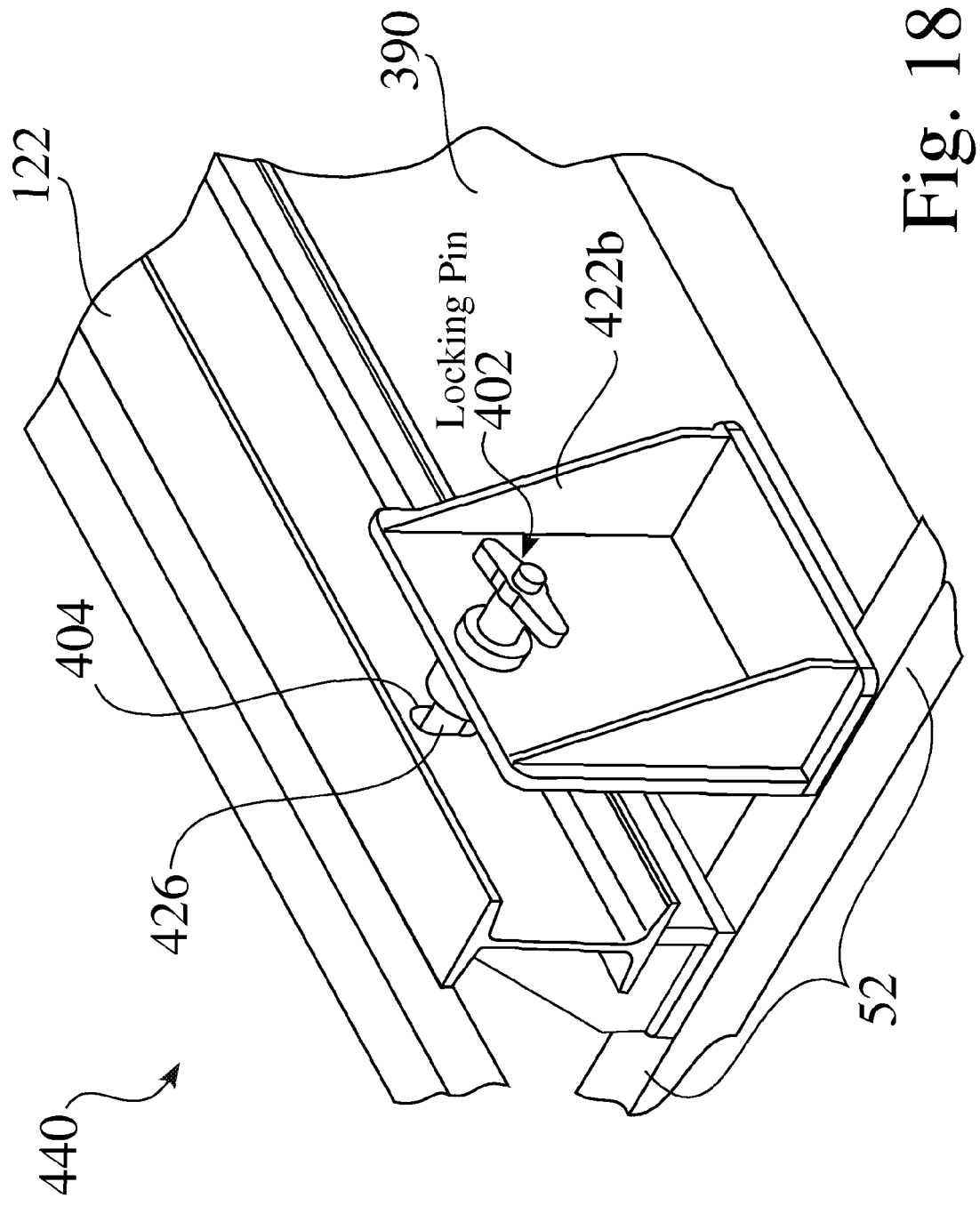
FIG. 18 is an isometric view of an exemplary trolley with a locking pin engaging an I-beam rail.

FIG. 17 is an end view 420 of an exemplary roller guide assembly 52 with a locking pin 402 engaging an I-beam rail 122. FIG. 18 is a partial view 440 of an exemplary roller guide assembly 52 with a locking pin 402 engaging an I-beam rail 122. The exemplary roller guide assemblies 52 seen in FIG. 17 and FIG. 18 are configured to surround the I-beam rail 122 with a pincer structure 422, such as comprising a single pincer 422 (FIG. 7), or opposing pincers 422*a*,422*b* (FIG. 17). As further seen in FIG. 17, a wheel 424, mounted through the yoke, e.g. 425*a*, 425*b*, of the pincers 422*a*, 422*b* engages the underside of the I-beam rail 122. While the roller guide assemblies 52 may preferably be configured to clear the I-Beam rail 122 during ordinary conditions, the roller guide assemblies 52 provide vertical and lateral stability, i.e. protection against tipping, via engagement between the pincers 422 and the I-Beam rail 122, should the MCP cart 42 shift unexpectedly, such as during any of during loading, unloading, or transit.

One or more of the roller guide assemblies 52 may preferably be configured to be lockable in relation to the I-Beam rail 122. For example, the roller guide assembly 52 seen in FIG. 17 and FIG. 18 further comprises a horizontal locking pin 402, which is configured to slide through aligned holes 430 in the two pincer halves 422*a*,422*b* and a corresponding hole 404 (FIG. 17) in the I-Beam rail 122 (FIG. 18).

Figure 19:
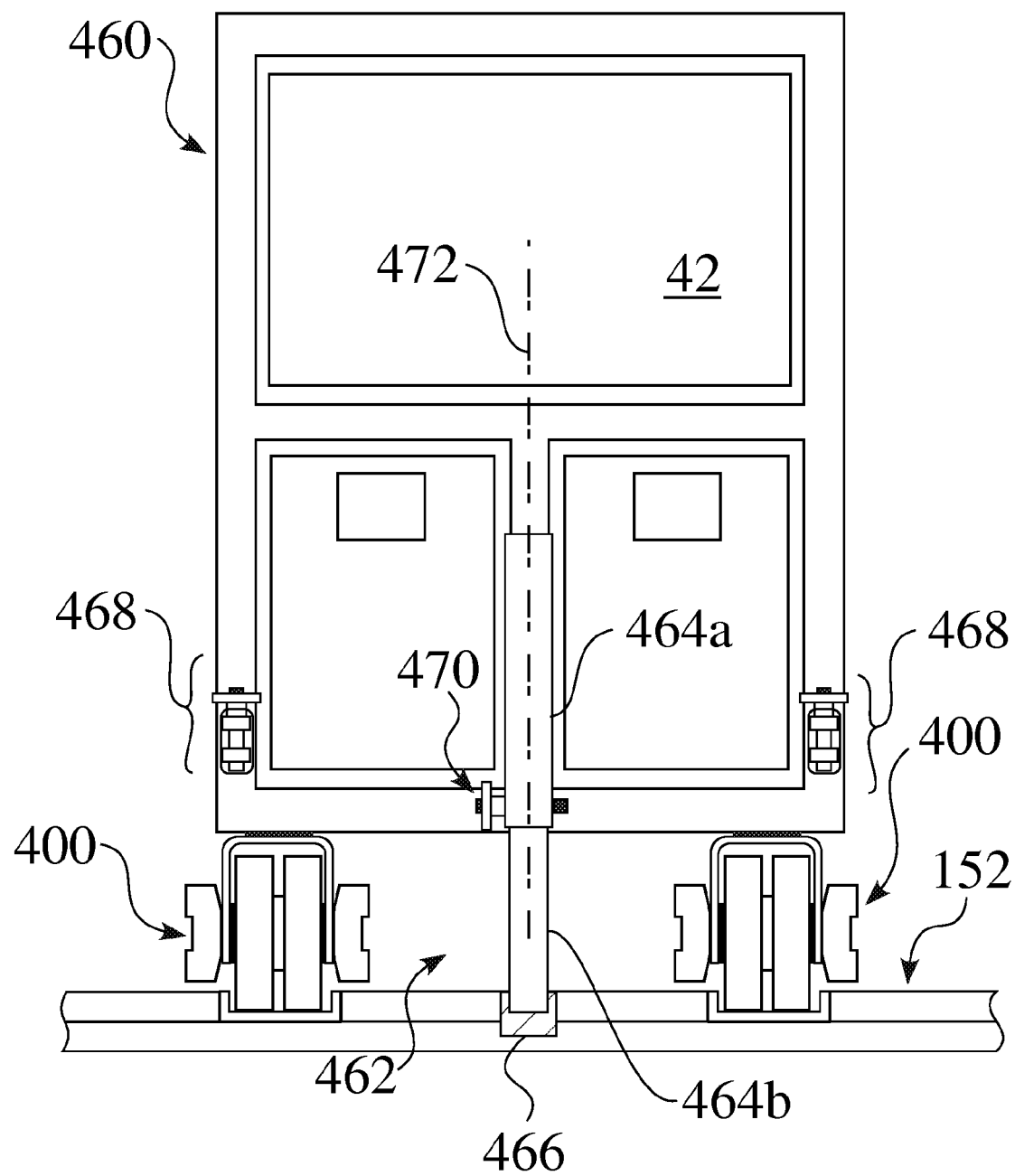
FIG. 19 shows dual caster wheels and a floor-based locking mechanism with telescoping tubing.

FIG. 19 is a schematic view 460 that shows dual castered wheels 400 for an MCP cart 42, and a floor-based locking mechanism 462, with telescoping tubing. For example the MCP cart 42 and expeditionary module shown in FIG. 19 are configured to lock together. The exemplary floor-based locking mechanism 462 seen in FIG. 19 comprises telescoping tube elements 464*a*,464*b* that, when extended downward from the MCP cart 42, engages a mating hole 466 (of slightly larger dimension) in the floor 152. A small retention pin 470, such as perpendicular to the telescoping axis 472, may preferably retain the lower telescoping tube 464*b* against unintended lowering during any of loading, unloading, and exterior movement of the carts 42, and/or may retain the lower telescoping tube 464*b* in a locked position as desired, to prevent movement of the MCP carts 42 along the U-channel tracks 144 and I-Beam rail 122 during transit.

Figure 20:
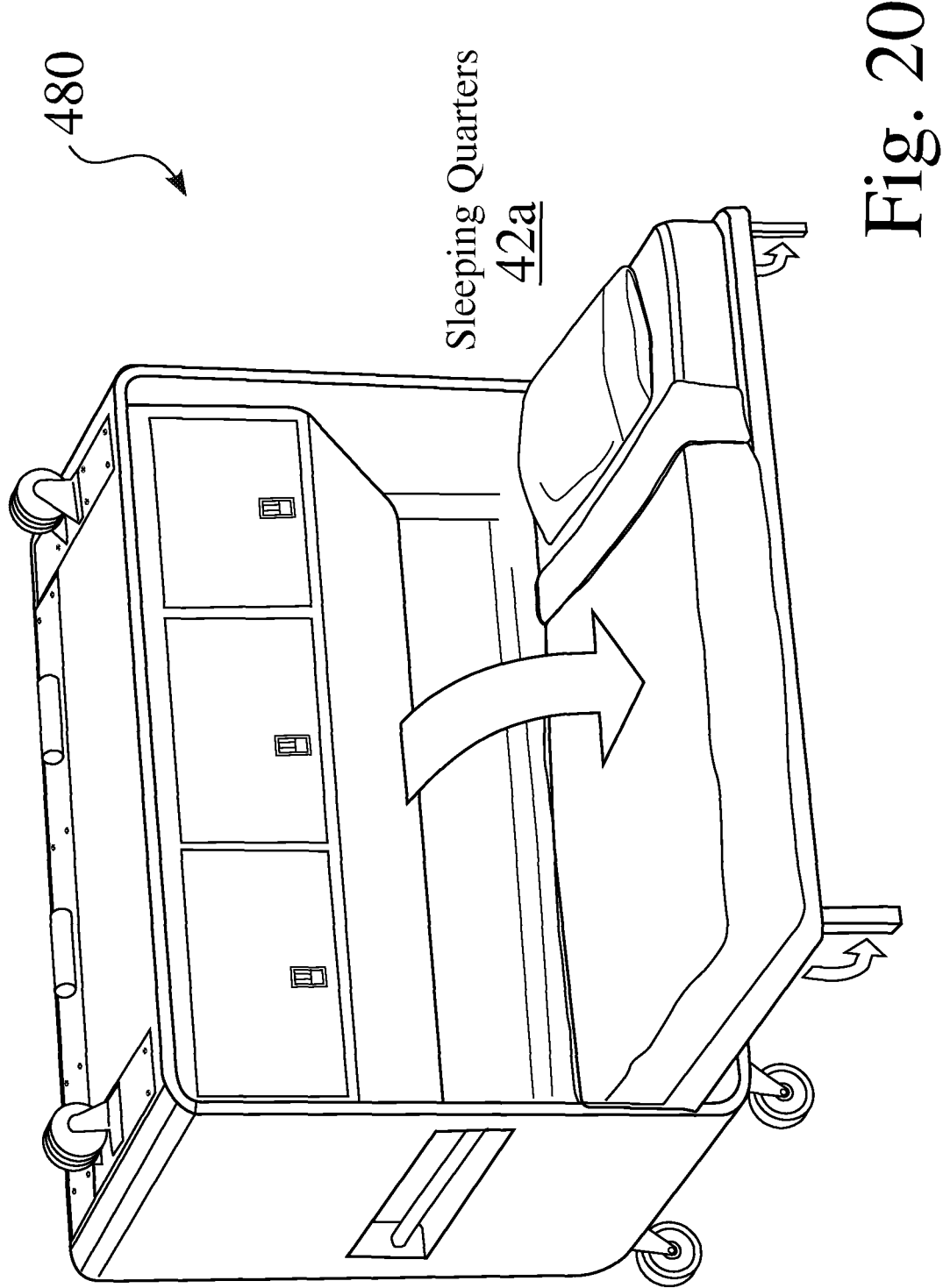
FIG. 20 shows an exemplary MCP cart that is configured to provide sleeping quarters.
Figure 21:
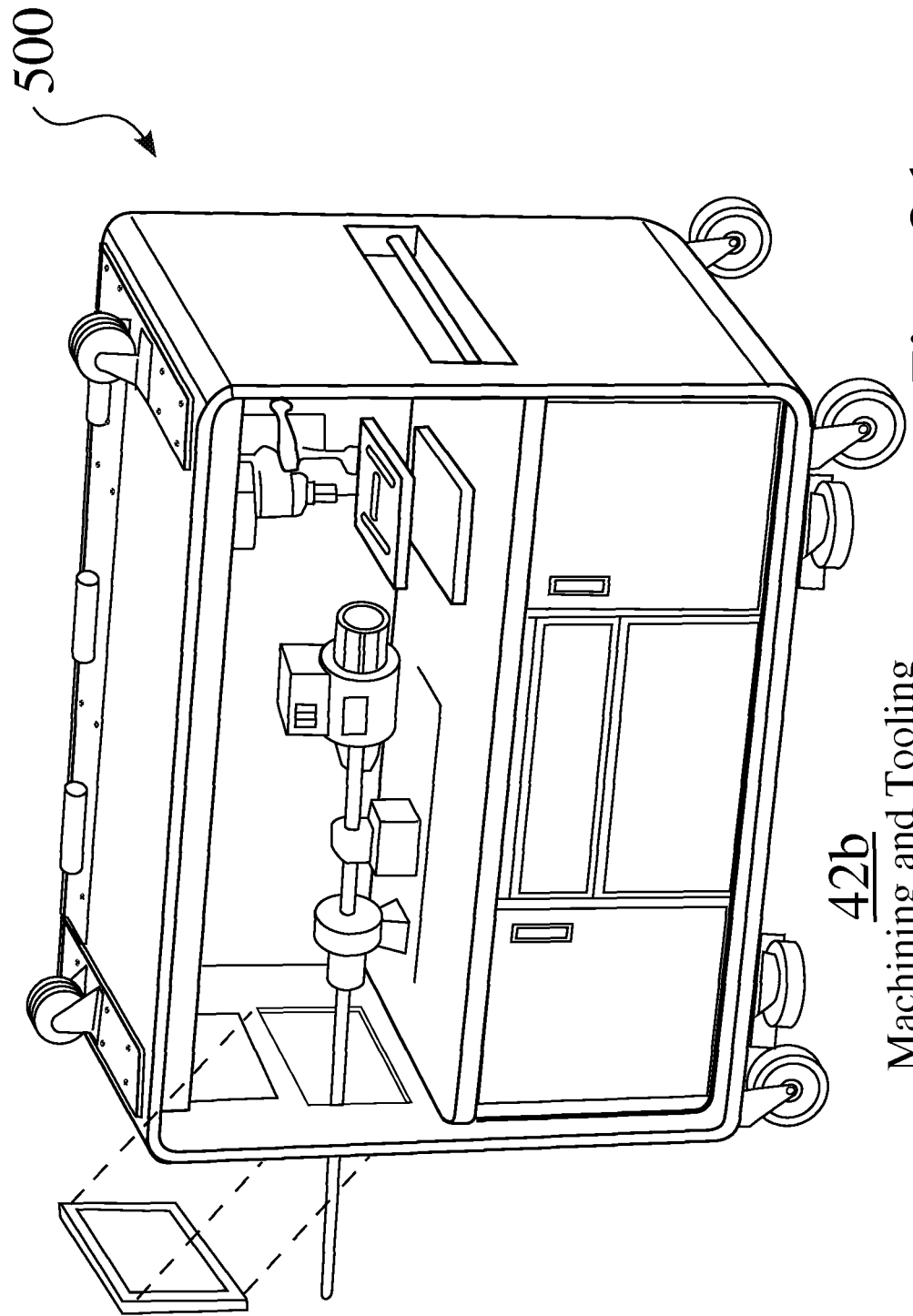
FIG. 21 shows an exemplary MCP cart that is configured to provide any of machining or tooling.
Figure 22:
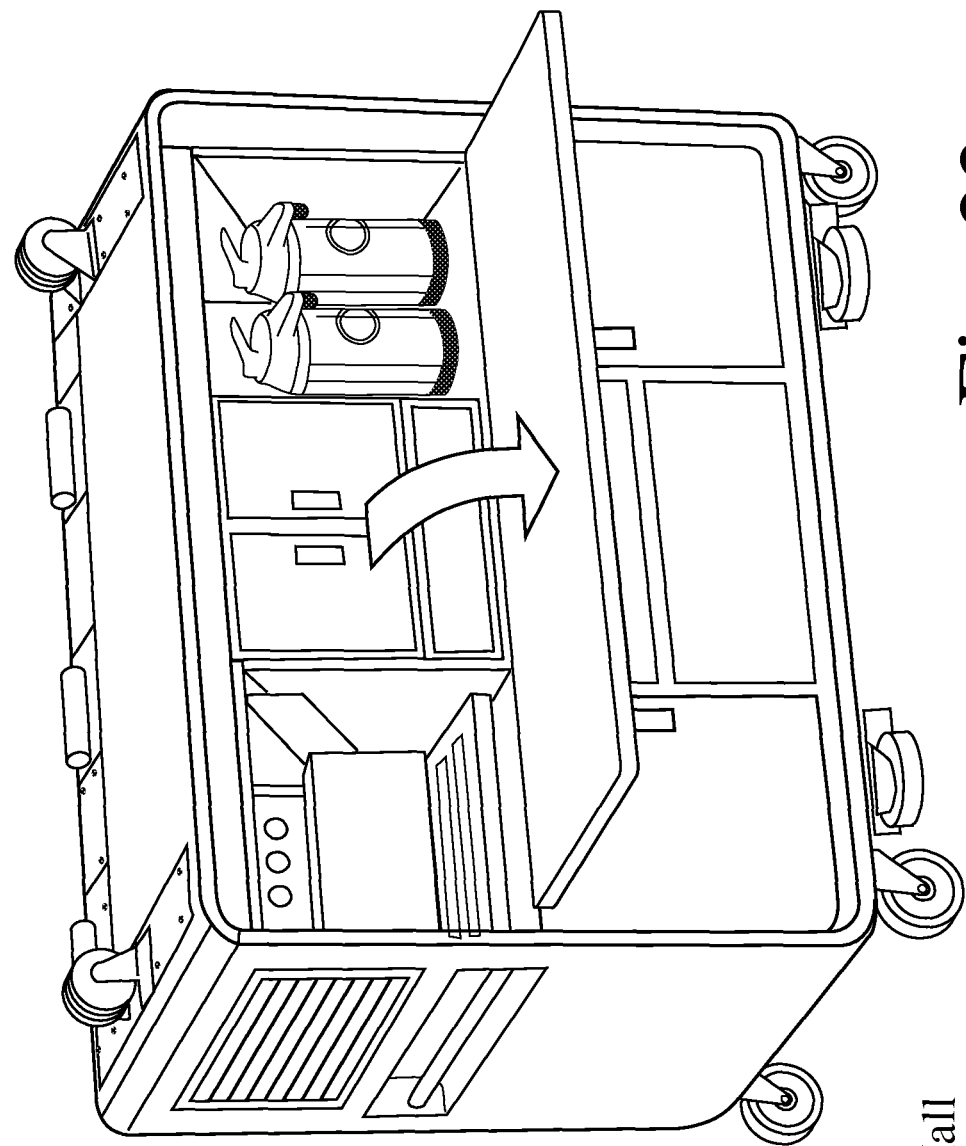
FIG. 22 shows an exemplary MCP cart that is configured to provide catering functionality.
Figure 23:
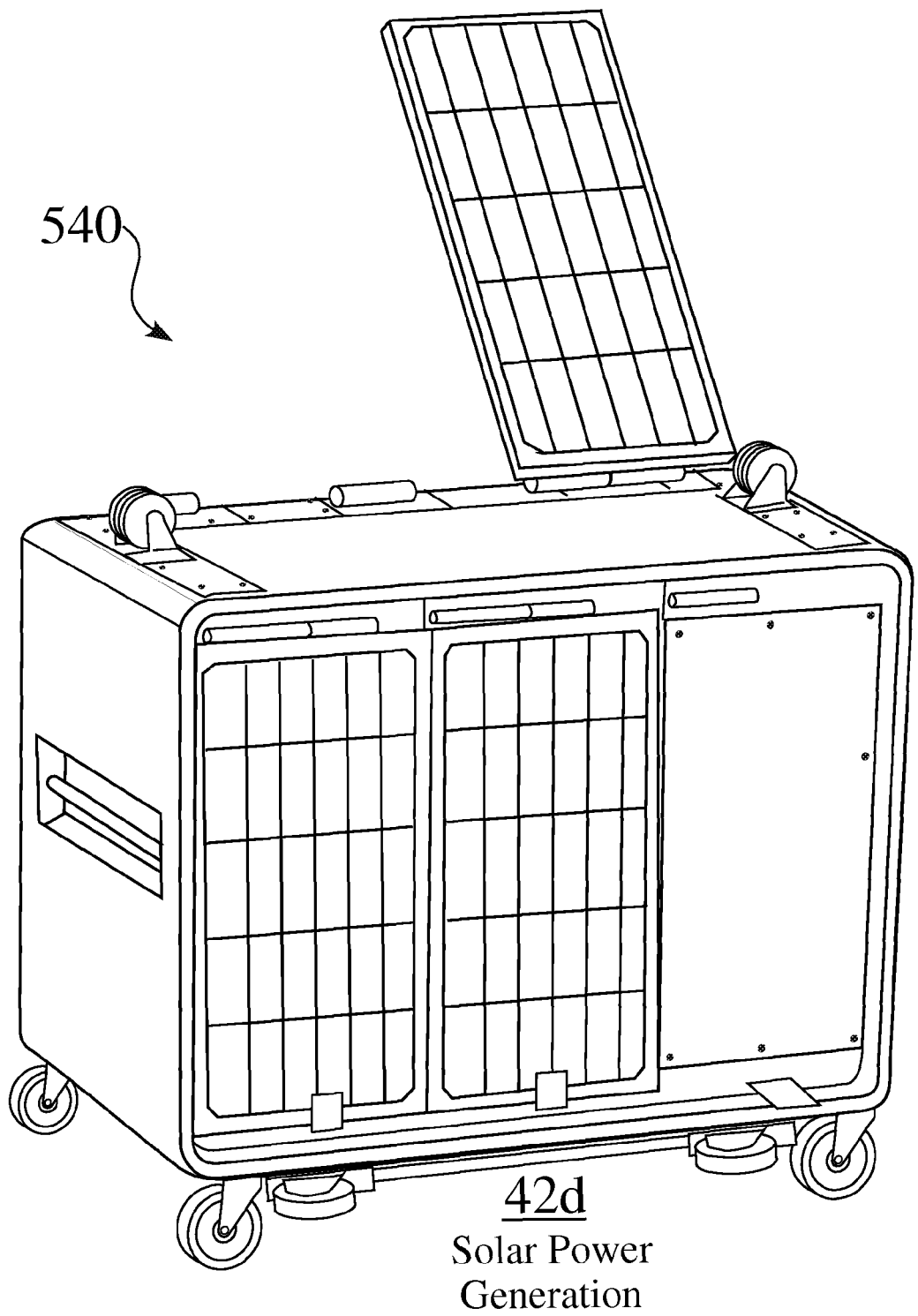
FIG. 23 shows an exemplary MCP cart that is configured to provide solar power generation.

Exemplary MCP Cart Configurations. MCP carts 42 may preferably be fitted with equipment providing a vast range of capabilities. For example, FIG. 20 shows 480 an exemplary MCP cart 42*a* that is configured to provide sleeping quarters. FIG. 21 shows 500 an exemplary MCP cart 42*b* that is configured to provide any of machining or tooling. FIG. 22 shows 520 an exemplary MCP cart 42*c* that is configured to provide catering functionality. FIG. 23 shows 540 an exemplary MCP cart 42*d* that is configured to provide solar power generation. While the MCP carts 42 seen in FIGS. 20-23 show some exemplary capabilities, specific MCPs 42 may preferably provide any of:

Machining and Tooling: Includes a lathe, drills, saws, hand tools, measurement devices, and various air tools;

Communications: Includes assorted radios and antennas, radio scanner, sensor masts, digital audio recorder, modems, and advanced mesh networking technologies;

Disaster Relief: Includes a rangefinder, Geiger counter, gas detector, water test kit, air quality sensor, UAV, and water purification system; and/or Command, Control, Communications, Computers, Intelligence, Surveillance and Reconnaissance: Based on an open system architecture, includes standard government command, control, communications, and computer systems integrated with an internal network for Secret Internet Protocol Router Network (SIPRNet) and Non-Classified Internet Protocol Router Network (NIPRNet) connectivity.

Other capabilities for which MCP carts may be configured may comprise any of:

Advanced Welding;
Plastics Fabrication;
Painting and Finishing;
Electrical Service;
RF Analysis;
Chemical Lab;
Chemical and Biological Analysis;
Microscopy and Forensics;

Field Medicine;
High Efficiency Fuel Cell Power Generation;
High-Capacity Air Compressors; and/or
Area Lighting.

Figure 24:
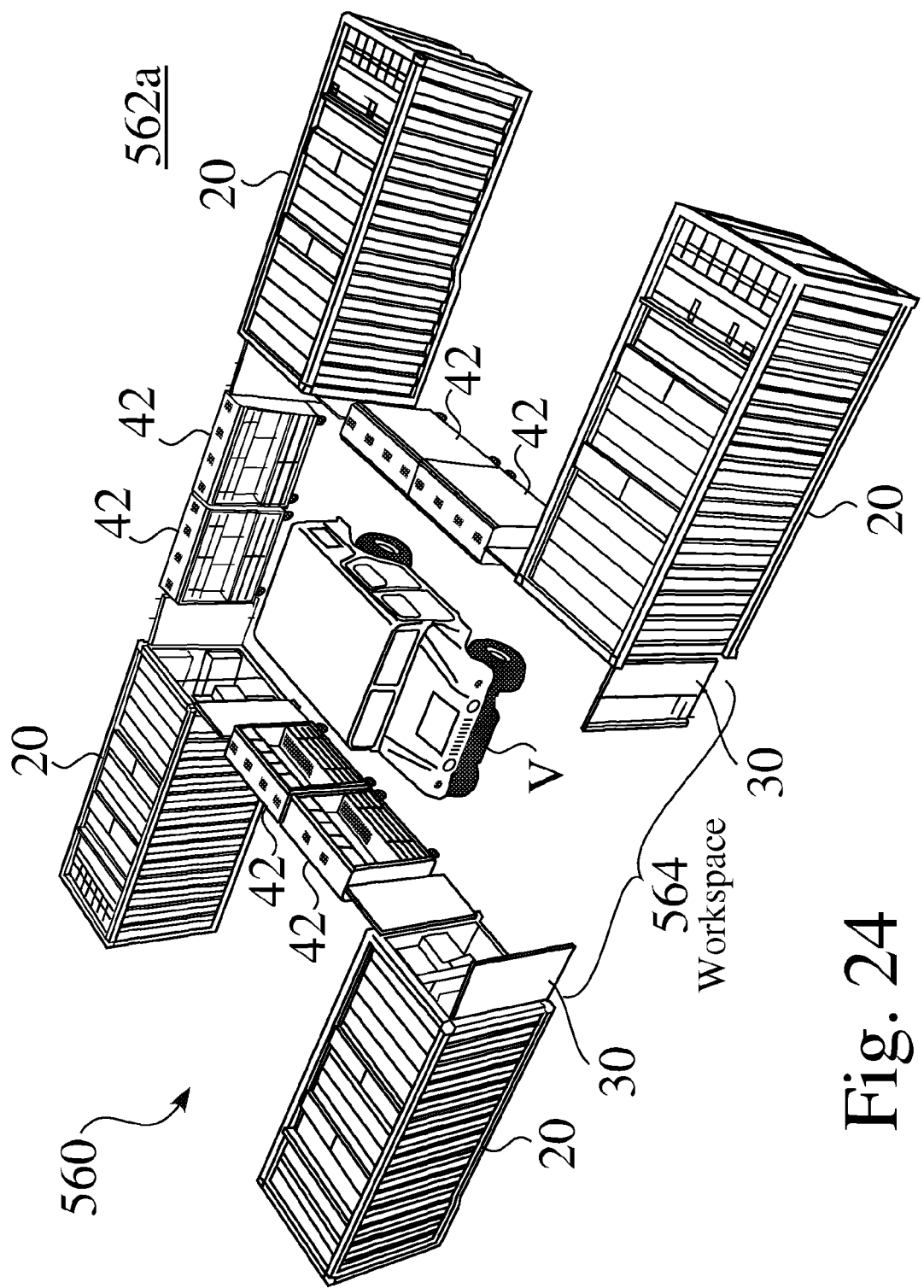
FIG. 24 shows an exemplary system configuration of exemplary expeditionary module containers and MCP carts that are configured to provide a vehicle shelter.
Figure 25:
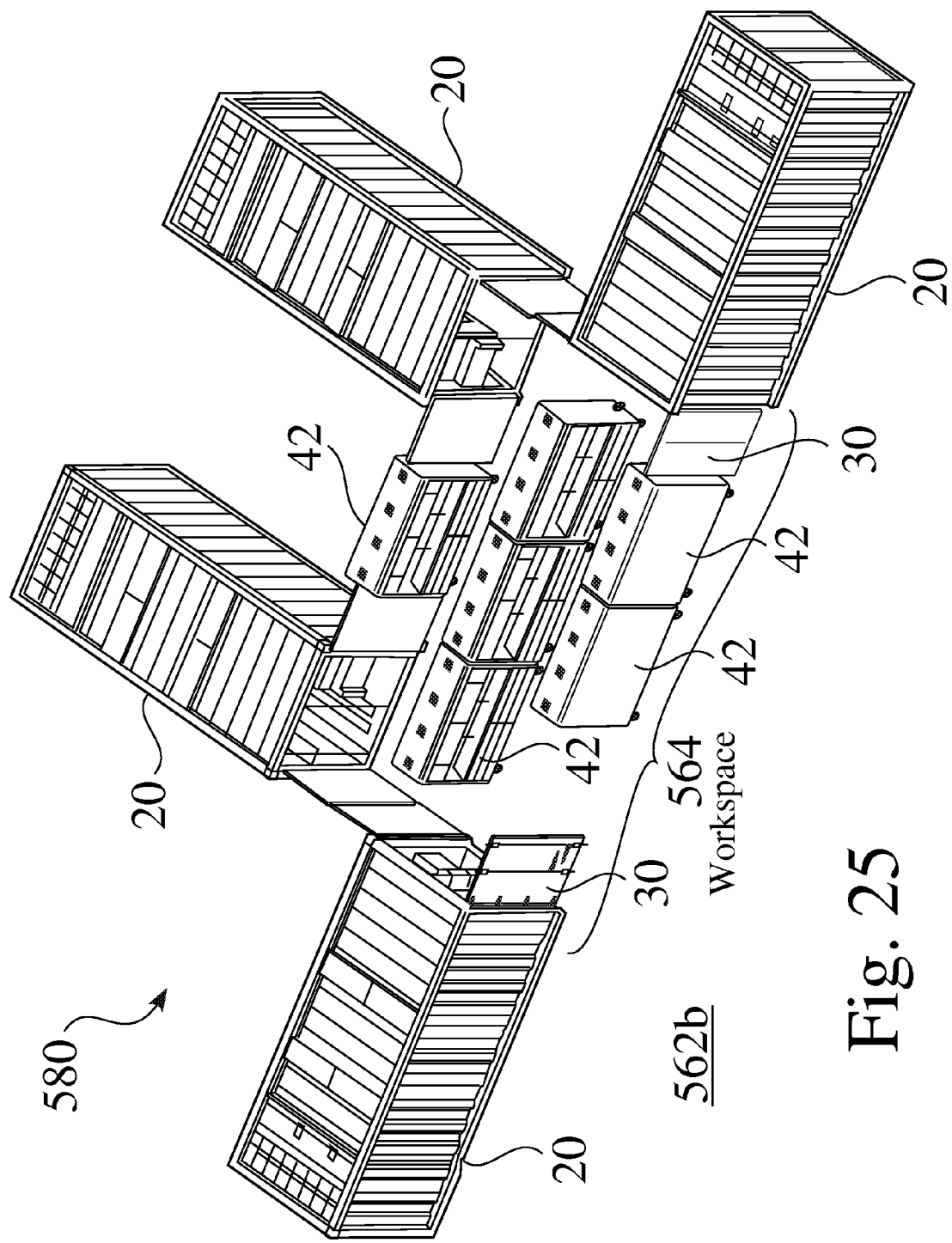
FIG. 25 shows an exemplary system configuration of exemplary expeditionary module containers and MCP carts that are configured to provide an enclosed workshop.
Figure 26:
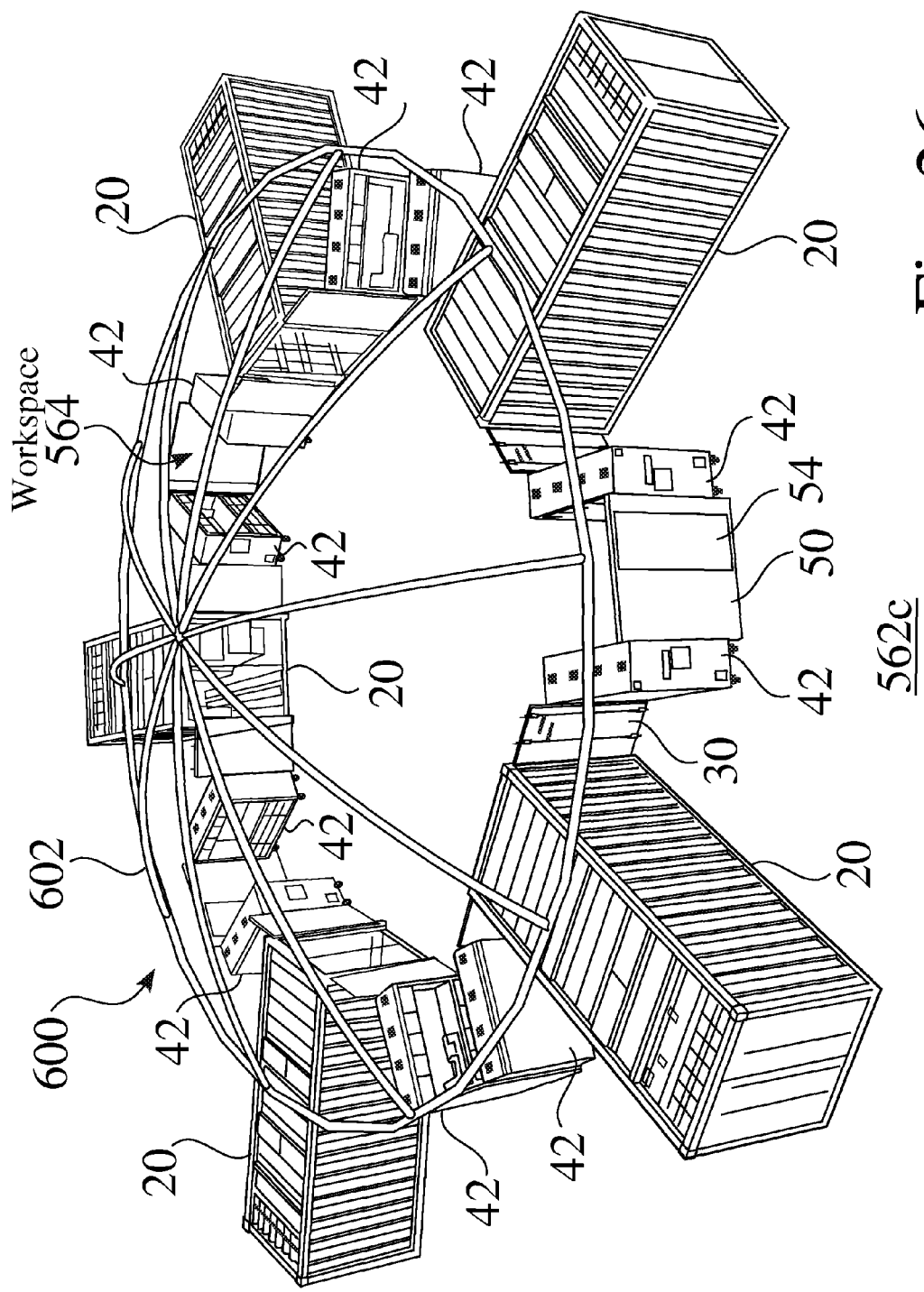
FIG. 26 shows an exemplary radial system configuration of exemplary expeditionary module containers and MCP carts that are configured to support an overhead structure.

Exemplary System Deployment Configurations. FIG. 24 shows an exemplary system configuration 562a of containers and MCP carts 42 that are configured to provide a shelter for one or more vehicles V. FIG. 25 shows an exemplary system configuration 562b of containers and MCP carts 42 that are configured to provide an enclosed workshop. FIG. 26 shows an exemplary radial system configuration 562c of containers 20 and MCP carts 42 that are configured to support an overhead structure 602.

Mission Capabilities Packages. As noted above, the MCP carts 42 provide a customizable and interchangeable set of specialized capabilities for an expeditionary module 20. The MCP carts 42 are preferably stowed within the expeditionary module 20 during transport. When unloaded from the expeditionary module 20 upon arrival, the removal of the MCP carts 42 opens the aisle 58 for use of standard equipment on either side 56, e.g. 56a,56b, of the aisle 58, and expand the work area available to the personnel USRs beyond the interior 36 of the container 22.

Figure 27:
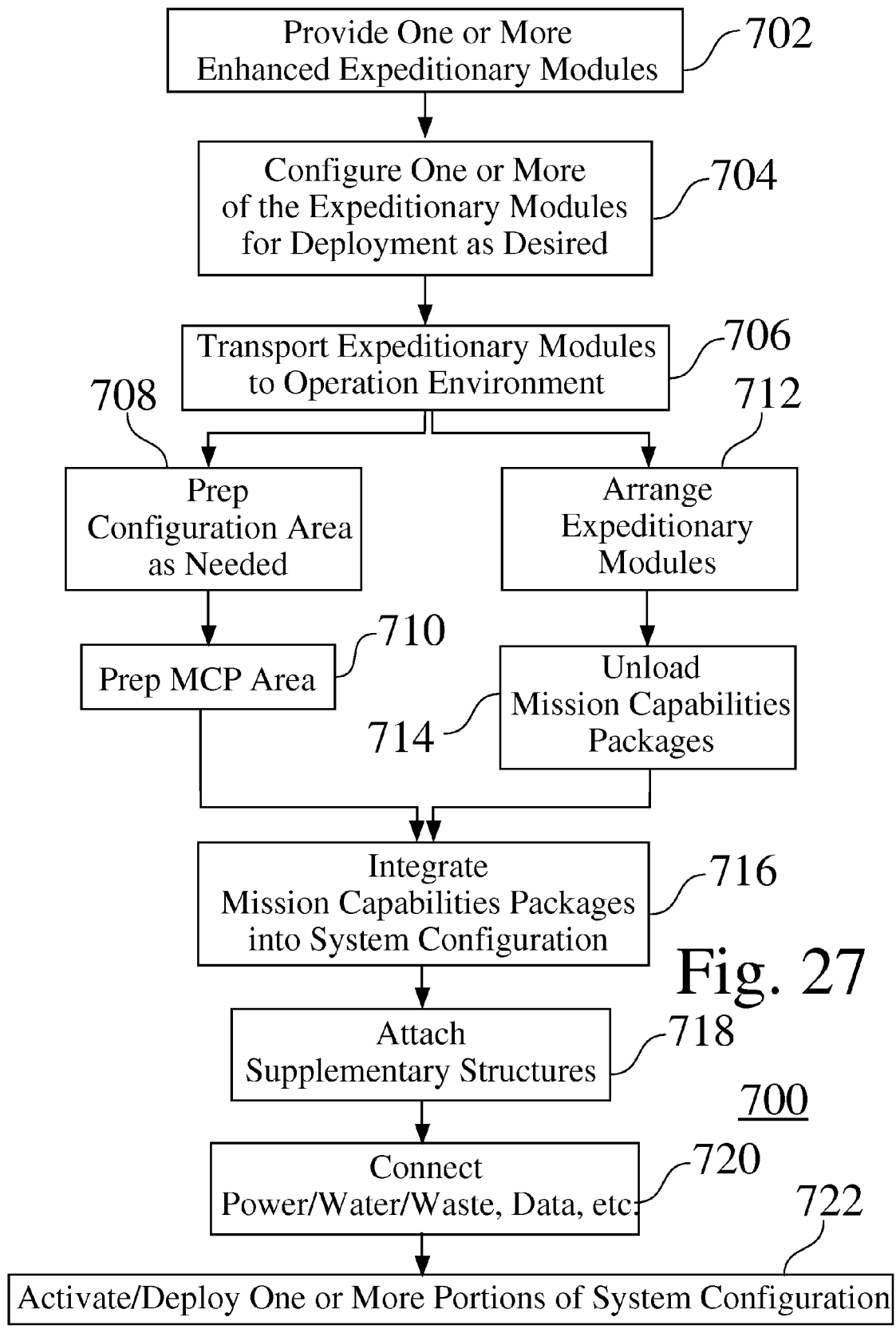
FIG. 27 shows an exemplary process for configuring and deploying a system having one or more expeditionary modules.

FIG. 27 shows an exemplary process 700 for configuring and deploying a system 562 comprising one or more expeditionary modules 20. For example, at step 702, one or more expeditionary modules 20 are provided. Based on a desired operation, one or more of the expeditionary modules 20 may be configured 704, e.g. such as but not limited to selecting which MCP carts 42 are to be used. At step 706, the expeditionary modules 20 are transported to the desired location ENV. As needed, the area for a desired expedition system 562 may be prepared 708, and/or the area for one or more MCP carts 42 may be prepared 710. At step 712, the expeditionary modules 20 are arranged, such as based upon the desired configuration 562. At step 714, the MCP carts 42 are unloaded 714 and positioned 716 as desired, e.g. based upon the desired configuration 562. As necessary, one or more supplementary structures 782 and/or accessories 790, e.g. 784,786,788, may preferably be integrated 718 into the system configuration 562. At step 720, personnel USRs may provide or connect balance of plant (BOP), such as but not limited to any of power, water, data lines, communication systems, compressed air, or waste systems, such that one or more portions of the system 562 may be activated or deployed 722.

FIG. 28 is a schematic depiction 740 of different mechanisms 742 that may preferably be used for the transport of expeditionary modules 20, such as but not limited to any of fixed wing aircraft 744, rotating wing aircraft 746, ships or other watercraft 748, e.g. boats, barges or rafts, trucks 750, or trains 752, or any combination thereof.

FIG. 29 is a schematic block diagram 780 of some of the different related structures and systems which may preferably associated with the deployment of one or more expeditionary modules 20. For example, connection systems 782 and associated hardware may preferably be used to establish a system configuration 562 using one or more expeditionary modules in an operation environment ENV, wherein the exemplary connection system 782 seen in FIG. 29 comprises expeditionary module (EM) to MCP connection structures 784, MCP to MCP connection structures 786, EM to EM connection structures 788. As well, one or more accessories 790 may preferably be used within a system operation, such as but not limited to any of ground surface, mats and/or flooring 792, framework 794 and associated hardware for roofing, fencing, and/or wind breaks, solar panels 796, and/or tarps, netting, and/or camouflage 798. Other balance of plant (BOP) equipment 800 may be used, such as but not limited to any of power 802, HVAC 804, compressed air 806, data systems and/or networks 808, communication systems 810, control/monitoring 812, or any combination thereof. A wide variety of tools 814 may preferable be provided for an operation, either as equipped as part of one or more of the expeditionary modules 20, or provided in addition to those provided. In addition, numerous supplies may be required for an operation, such as but not limited to any of fuel 822, materials 824, consumables 826, food 828, and/or water 830.

Number and Sizes of Carts. A currently preferred embodiment of the expeditionary module 20 is configured to contain two MCP carts 44, wherein each of the MCP carts 42 has a length that is approximately one-half of the length of the longitudinal aisle 148, wherein the two MCP carts 42 may preferably be loaded into and stowed within the container 20, in an-end-to-end fashion.

However, the U-channel track and I-beam rail system 142 can support essentially any number of MCP carts 42, with a total length less than or equal to the aisle length. For example, the expeditionary module 20 may be configured to contain any of:

a single cart 42 with a length equal to the aisle length;
one cart with a length equal to two-thirds the aisle length; or
three carts each with a length equal to one-third of the aisle length.

Accordingly, the floor 152 and I-Beam rail 122 preferably contain a number of holes to receive telescoping locking tubes and horizontal locking pins of carts of various lengths. In one approach, the holes are spaced to secure a system of carts 42 of standardized sizes, in which each cart size is a fraction of the next larger cart size.

For example, in a standardized system of carts 42 equaling one-half, one-quarter, or one-eighth of the aisle length, an expeditionary module 20 may preferably contain one half-length cart, one quarter-length cart, and two eighth-length carts. Similarly, in a standardized system of carts 42 equaling one-third and one-sixth of the aisle length, an expeditionary module 20 may preferably contain one third-length cart, and three sixth-length carts.

Such systems of standardized cart lengths provide an optimal balance of packing efficiency and flexibility upon readying an expeditionary module 20 for deployment.

Deployment Configurations. After the MCP carts 42 are unloaded from the container 20, the wheels or slides 400 enable free translation and rotation of the carts in the container vicinity. For especially rough exterior surfaces, interlocking, tiled mats 792 (FIG. 29) may preferably be laid down, such as to provide a smoother rolling surface for the MCP carts 42, and a walking surface for the personnel USRs. Once positioned at a desired location and position, hinged side-panels, e.g. 82, can either be raised, to create an awning, or lowered, to provide workbenches (FIG. 3), that substantially extend the working surface area, e.g. such as for but not limited to any of vices, clamps, or hand tools, beyond that available within the container 22.

The MCP carts 42 can be arranged in a wide variety of configurations. In a preferred embodiment of the of the expeditionary module 20, such as seen in FIG. 3, two MCP carts 42 may preferably be unloaded from the container 22, positioned a short distance outward form the longitudinal centerline of the container 22, and oriented parallel to the longitudinal centerline of the container 22. A fastening system 784 (FIG. 29) may preferably be provided, such as to allow the ends of the MCP carts 42 to be connected to the container 22, and to secure against unintended cart movement, such as during subsequent usage, thereby providing structural rigidity to the resulting MCP cart and container configuration 562.

In one embodiment, a clevis, tang, and pin system, e.g. 468 (FIG. 19), connects the ends of the MCP carts 42 to the free ends of the open container doors 30. Cross bracing 84 (FIG. 3), e.g. such as using but not limited to the U-channel ramp extensions 162, may preferably span between MCP carts 42, which may additionally support additional panels or tarps 798 (FIG. 29), such as to provide protection against any of sun, dust, wind, and rain.

Preferably, the connection system 782 (FIG. 29) also allows MCP carts 42 to be connected 786 (FIG. 29) to other MCP carts 42, and may preferably allow containers 22 to be connected 788 (FIG. 29) to other containers 22. This allows multiple expeditionary modules 20, e.g. comprising a large number of carts 42, to be arrayed in a great variety of configurations. For example, linear configurations 562, e.g. 562a (FIG. 24), 562b (FIG. 25), or radial configurations 562, e.g. 562c (FIG. 26), can define a workspace 564, protect equipment and personnel against the elements, enhance privacy and security, and provide support for overhead structures, e.g. 602 (FIG. 26).

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

All directional references, e.g. proximal, distal, upper, lower, upward, downward, left, right, lateral, front, back, top, bottom, above, below, vertical, horizontal, clockwise, and counterclockwise, are only used for identification purposes to aid the reader's understanding of the present invention, and do not create limitations, particularly as to the position, orientation, or use of the invention. Connection references, e.g. such as but not limited to attached, affixed, coupled, connected, and joined, are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Accordingly, although the invention has been described in detail with reference to particular preferred embodiments, persons possessing ordinary skill in the art to which this invention pertains will appreciate that various modifications and enhancements may is be made without departing from the spirit and scope of the claims that follow.

The invention claimed is:

1. An expeditionary module, comprising:
   a container having an interior region defined therein, wherein the container extends from a first end to a second end, and wherein the container comprises
   one or more doors at the first end,
   a floor, and
   a ceiling opposite the floor;
   one or more mission capabilities package (MCP) carts, wherein each of the one or more MCP carts comprise at least one retaining mechanism and a plurality of casters; and
   a stowing mechanism for stowing the one or more MCP carts within the interior region of the container, wherein the stowing mechanism comprises
   an I-Beam rail affixed to the ceiling within the interior region of the container, wherein the I-Beam rail extends longitudinally from the first end of the container toward the second end of the container,
   wherein the at least one retaining mechanism associated with the one or more MCP carts is configured to confine movement of the one or more MCP carts along the I-Beam rail; and
   one or more U-channel tracks located on the floor of the container, wherein the U-channel tracks are configured to receive the plurality of casters of the one or more MCP carts.

2. The expeditionary module of claim 1, wherein the plurality of casters are configured for rolling the one or more MCP carts into and out of the interior region of the container.

3. The expeditionary module of claim 1, wherein the container is configured to be transportable by any of a fixed wing aircraft, a rotating wing aircraft, a truck, a train, or a ship.

4. The expeditionary module of claim 1, wherein the container comprises a standard shipping container.

5. The expeditionary module of claim 1, wherein the interior region comprises a first interior region extending from the first end, a utility space extending from the second end, and an interior bulkhead located between and defining the first interior region and the utility space.

6. The expeditionary module of claim 1, further comprising:
   a locking mechanism that is configured to affix the one or more MCP carts to the floor of the container.

7. The expeditionary module of claim 1, further comprising:
   a suite of standardized equipment within the interior region of the container.

8. The expeditionary module of claim 1, further comprising:
   a mechanism for connecting a first of the MCP carts to a second of the MCP carts.

9. The expeditionary module of claim 1, further comprising:
   a mechanism for connecting at least one of the MCP carts to the container.

10. The expeditionary module of claim 1, further comprising:
    a mechanism for connecting the container of the expeditionary module to a container of another expeditionary module.

11. A system comprising one or more expeditionary modules, wherein each of the one or more expeditionary modules comprises:
    a container having an interior defined therein, wherein the container extends from a first end to a second end, and wherein the container comprises
    one or more doors at the first end,
    a floor, and
    a ceiling opposite the floor;
    one or more mission capabilities package (MCP) carts, wherein each of the one or more MCP carts comprise at least one retaining mechanism; and a stowing mechanism for stowing the one or more MCP carts within the interior of the container, wherein the stowing mechanism comprises an I-Beam rail affixed to the ceiling within the interior of the container, wherein the I-Beam rail extends longitudinally from the first end of the container toward the second end of the container, wherein the at least one retaining mechanism associated with the MCP carts is configured to confine movement of the MCP carts along the I-Beam rail;

one or more tracks recessed within the floor of the container, wherein the tracks extend longitudinally from the first end of the container toward the second end of the container, wherein the one or more tracks are configured to receive the one or more MCP carts; and wherein said at least one retaining mechanism associated with the one or more MCP carts is further configured to confine the one or more MCP carts with respect to the one or more tracks;

wherein the one or more expeditionary modules may be configured in a plurality of configurations.

* * * * *